United States Patent
Furukawa et al.

[11] Patent Number: 5,835,846
[45] Date of Patent: Nov. 10, 1998

[54] MOBILE SATELLITE COMMUNICATION SYSTEM

[75] Inventors: Kenji Furukawa, Yokohama; Yasuki Nishi, Yokosuka; Hiroshi Kobayashi, Yokohama; Yoshihisa Ohno, Yokohama; Eiji Kodama, Yokohama, all of Japan

[73] Assignee: NTT Mobile Communications Network, Inc., Japan

[21] Appl. No.: 571,126

[22] Filed: Dec. 12, 1995

[30] Foreign Application Priority Data

Dec. 13, 1994 [JP] Japan .................................. 6-308893

[51] Int. Cl.$^6$ .............................. H04B 7/26; H04B 17/00
[52] U.S. Cl. .......................... 455/10; 455/13.4; 455/52.1; 455/67.1; 455/69; 455/226.2
[58] Field of Search .......................... 455/10, 12.1, 13.4, 455/52.1, 67.1, 69, 70, 134, 277.2, 226.1, 226.2, 226.3, 54.1, 54.2

[56] References Cited

U.S. PATENT DOCUMENTS

| 4,868,885 | 9/1989 | Perry | ........................................ 455/10 |
| 5,305,468 | 4/1994 | Bruckert et al. | ........................... 455/69 |

FOREIGN PATENT DOCUMENTS 1-213016  8/1989  Japan .
1-147924  6/1992  Japan .

OTHER PUBLICATIONS

Technical report of IEICE, Nov. 7, 1989.

*Primary Examiner*—Chi H. Pham
*Attorney, Agent, or Firm*—Rogers & Wells; George P. Hoare, Jr.

[57] ABSTRACT

A transmission power control method in a mobile satellite communication system implementing accurate control of transmission power of a base station by obtaining an average received signal level at a mobile station at high accuracy. The mobile station measures an average received signal level $Q_k$ in a predetermined period (step SP2), and informs the base station of the average received signal level $Q_k$ and an actual measuring time $T_k$ (step SP3). The base station calculates a total measuring time $t_k$ which is the sum total of the actual measuring time $T_k$ (step SP16), a corrected average received signal level $R_k$ associated with the average received signal level during the total measuring time $t_k$ (step SP18), and a measuring error $\Delta D_k$ (step SP17), and controls the transmission power on the basis of these values (step SP21). Estimating the measuring error $\Delta D_k$ in the total measuring time $t_k$ longer than the individual actual measuring time $T_k$ makes it possible to reduce the measuring error, thereby implementing highly accurate transmission power control.

18 Claims, 16 Drawing Sheets

| SIGNAL IDENTIFIER (ID) | AVERAGE RECEIVED SIGNAL LEVEL INFORMATION ($Q_k$) | ACTUAL MEASURING TIME ($T_k$) |
|---|---|---|
| | | |

RECEIVED SIGNAL LEVEL INFORMATION (SG)

*FIG.6*

MOBILE SATELLITE COMMUNICATION SYSTEM

BACKGROUND OF THE INVENTION

1. Field of the Invention

The present invention relates to a mobile communication system in which base stations are connected to mobile stations through a communication satellite, and in particular to a mobile satellite communication system and a transmission power control method in the system capable of achieving highly accurate transmission power control of forward links from a base station to mobile stations.

2. Description of Related Art

Generally, transmission power control is carried out between a base station and mobile stations. For example, the base station determines optimal transmission power using information on received signal levels fed from the mobile stations. This is performed for reducing interference between channels.

FIGS. 1A and 1B are diagrams illustrating radio-wave propagation characteristics in a cellular system. A radio wave radiated from a base station 1 arrives at a mobile station 2 through multipaths in the form of a direct wave 4 and reflected waves 5 reflected on buildings 3 or the like. Accordingly, the radio-wave propagation characteristics are determined by multipath fading, and the received power level of the mobile station 2 sharply varies in short periods as shown in FIG. 1B. This enables the mobile station 2 to obtain a considerably accurate average received signal level by detecting the level of a signal in a short period. The mobile station 2 informs the base station 1 of the average received signal level, and the base station 1 controls the forward link transmission power to the mobile station 2 on the basis of the information.

FIG. 2 is a diagram illustrating the forward link transmission power control. As shown in FIG. 2(B), the mobile station 2 calculates the average received signal level at each measuring period T, and informs the base station 1 of the values. The base station 1 transmits at the transmission power corresponding to the level each time the average received signal level information is provided as shown in FIG. 2(A). Through such forward link transmission power control, the transmission power from the base station 1 to the mobile station 2 reaches an optimum value in a rather short time. In this case, the control error E contained in the transmission power control value of the base station is kept approximately constant regardless of the transmission power as shown in FIG. 2(C). This is because the measuring period at the mobile station 2 is constant.

In contrast with this, in a mobile satellite communication system, in which the base station 1 is linked with the mobile station 2 by way of a satellite, the transmission power control is chiefly needed for effectively availing the power of the satellite.

FIGS. 3A and 3B are diagrams illustrating radio-wave propagation characteristics of a mobile satellite communication system. A radio wave radiated from the base station 1 reaches a satellite 10 through a path 11, is repeated by the satellite, and arrives at the mobile station 2 through a path 12. Accordingly, the radio-wave propagation characteristics of the mobile satellite communication system do not exhibit multipath fading characteristics as in the cellular system, and the direct wave from the satellite 10 to the mobile station 2 is dominant. Thus, the variation in the mobile satellite communication system exhibits Rice fading of about 1 Hz in bandwidth and a C/M (Carrier-to-Multipath fading) of an order of ten dB. Accordingly, an accurate average received signal level cannot be expected by short period measurement. As a result, the transmission power control as employed in the cellular system presents a problem in the mobile satellite communication system in that it cannot provide accurate transmission power control. This will result in considerable degradation in channel quality and poor availability of the satellite power.

SUMMARY OF THE INVENTION

It is therefore an object of the present invention to provide a mobile satellite communication system and a transmission power control method in the system which can achieve accurate transmission power control in the shortest time possible.

In a first aspect of the present invention, there is provided a mobile satellite communication system in which a base station is connected with a mobile station via a communication satellite, the mobile station comprising:

measuring means for obtaining an actual measuring time $T_k$ and an average received signal level $Q_k$ (k=1, 2, ...) in a predetermined measuring period T; and transmission means for informing the base station of the actual measuring time $T_k$ and the average received signal level $Q_k$, and the base station comprising:

means for extracting the actual measuring time $T_k$ and the average received signal level $Q_k$ from a received signal sent from the mobile station;

means for calculating a total measuring time $t_k$ which is a sum total of the actual measuring time $T_k$;

means for obtaining a measuring error $\Delta D_k$ of an average received signal level in the total measuring time $t_k$;

storing means for storing a total measuring time $t_{k-1}$, a corrected average received signal level $R_{k-1}$ and a transmission power control amount $\Delta P_{k-1}$ at the end of a preceding measuring period of the mobile station;

means for obtaining a corrected average received signal level $R_k$ at the end of a present measuring period of the mobile station on the basis of the corrected average received signal level $R_{k-1}$, the transmission power control amount $\Delta P_{k-1}$, the total measuring time $t_{k-1}$, the average received signal level $Q_k$, the actual measuring time $T_k$ and the total measuring time $t_k$;

means for calculating a transmission power control amount $\Delta P_k$ of the base station on the basis of the measuring error $\Delta D_k$ and a difference between the corrected average received signal level $R_k$ and a predetermined reference value $R_{ref}$ of the received signal level of the mobile station; and means for obtaining present transmission power $P_k$ from the transmission power control amount $\Delta P_k$ and preceding transmission power $P_{k-1}$, and for controlling the transmission power of the base station by the present transmission power $P_k$.

Here, the base station may comprise means for setting an initial value $P_0$ of the transmission power at a predetermined value.

The means for calculating a transmission power control amount may obtain the present transmission power control amount $\Delta P_k$ of the base station by adding the measuring error $\Delta D_k$ to a difference between the reference value $R_{ref}$ of the received signal level and the corrected average received signal level $R_k$.

The means for calculating a transmission power control amount may obtain the present transmission power control amount $\Delta P_k$ of the base station by adding a sum of the measuring error $\Delta D_k$ and a level setting error $\Delta S_k$ at the base station to a difference between the reference value $R_{ref}$ of the received signal level and the corrected average received signal level $R_k$.

The means for obtaining the measuring error may obtain the measuring error $\Delta D_k$ by dividing a predetermined value C by a square root of the total measuring time $t_k$.

The means for obtaining the corrected average received signal level may obtain the corrected average received signal level $R_k$ by the following equation:

$$R_k\{(R_{k-1}+\Delta P_{k-1})t_{k-1}+Q_k T_k\}/t_k$$

In a second aspect of the present invention, there is provided a mobile satellite communication system in which a base station is connected with a mobile station via a communication satellite, the mobile station comprising:

measuring means for obtaining an actual measuring time $T_k$ and an average received signal level $Q_k$ (k=1, 2, ...) in a predetermined measuring period T;

means for calculating a total measuring time $t_k$ which is a sum total of the actual measuring time $T_k$;

means for obtaining a measuring error $\Delta D_k$ of an average received signal level in the total measuring time $t_k$;

storing means for storing a total measuring time $t_{k-1}$ and a corrected average received signal level $R_{k-1}$ at the end of a preceding measuring period of the mobile station;

means for extracting a transmission power control amount $\Delta P_{k-1}$ from a signal transmitted from the base station to the mobile station;

means for obtaining a corrected average received signal level $R_k$ at the end of a present measuring period of the mobile station on the basis of the corrected average received signal level $R_{k-1}$, the transmission power control amount $\Delta P_{k-1}$, the total measuring time $t_{k-1}$, the average received signal level $Q_k$, the actual measuring time $T_k$ and the total measuring time $t_k$; and transmission means for informing the base station of the corrected average received signal level $R_k$, and the base station comprising:

means for extracting the corrected average received signal level $R_k$ from a received signal sent from the mobile station;

means for calculating the transmission power control amount $\Delta P_k$ of the base station on the basis of a prestored level setting error $\Delta S_k$ and a difference between the corrected average received signal level $R_k$ and a predetermined reference value $R_{ref}$ of the received signal level of the mobile station;

means for obtaining present transmission power $P_k$ from the transmission power control amount $\Delta P_k$ and preceding transmission power $P_{k-1}$, and for controlling the transmission power of the base station by the present transmission power $P_k$; and means for transmitting information on the present transmission power control amount $\Delta P_k$ to the mobile station.

Here, the mobile station may further comprise means for setting an initial value $P_0$ of the transmission power at a predetermined value.

The means for calculating a transmission power control amount may obtain the present transmission power control amount $\Delta P_k$ of the base station by adding the level setting error $\Delta S_k$ to a difference between the reference value $R_{ref}$ of the received signal level and the corrected average received signal level $R_k$.

The means for obtaining the measuring error may obtain the measuring error $\Delta D_k$ by dividing a predetermined value C by a square root of the total measuring time $t_k$.

The means for obtaining corrected average received signal level may obtain the corrected average received signal level $R_k$ by the following equation:

$$R_k=\{(R_{k-1}+\Delta P_{k-1})t_{k-1}+Q_k T_k\}/t_k-\Delta D_k$$

In a third aspect of the present invention, there is provided a base station in a mobile satellite communication system in which the base station is connected with a mobile station via a communication satellite, the base station comprising:

means for extracting from a received signal an actual measuring time $T_k$ and an average received signal level $Q_k$ (k=1, 2, ...) in a predetermined measuring period T, the actual measuring time $T_k$ and the average received signal level $Q_k$ being obtained at the mobile station and transmitted from the mobile station to the base station;

means for calculating a total measuring time $t_k$ which is a sum total of the actual measuring time $T_k$;

means for obtaining a measuring error $\Delta D_k$ of an average received signal level in the total measuring time $t_k$;

storing means for storing a total measuring time $t_{k-1}$, a corrected average received signal level $R_{k-1}$ and a transmission power control amount $\Delta P_{k-1}$ at the end of a preceding measuring period of the mobile station;

means for obtaining a corrected average received signal level $R_k$ at the end of a present measuring period of the mobile station on the basis of the corrected average received signal level $R_{k-1}$, the transmission power control amount $\Delta P_{k-1}$, the total measuring time $t_{k-1}$, the average received signal level $Q_k$, the actual measuring time $T_k$ and the total measuring time $t_k$;

means for calculating a transmission power control amount $\Delta P_k$ of the base station on the basis of the measuring error $\Delta D_k$ and a difference between the corrected average received signal level $R_k$ and a predetermined reference value $R_{ref}$ of the received signal level of the mobile station; and means for obtaining present transmission power $P_k$ from the transmission power control amount $\Delta P_k$ and preceding transmission power $P_{k-1}$ and for controlling the transmission power of the base station by the present transmission power $P_k$.

In a fourth aspect of the present invention, there is provided a mobile station in a mobile satellite communication system in which a base station is connected with a mobile station via a communication satellite, the mobile station comprising:

measuring means for obtaining an actual measuring time $T_k$ and an average received signal level $Q_k$ (k=1, 2, ...) in a predetermined measuring period T; and transmission means for informing the base station of the actual measuring time $T_k$ and the average received signal level In a fifth aspect of the present invention, there is provided a mobile station in a mobile satellite communication system in which a base station is connected with a mobile station via a communication satellite, the mobile station comprising:

measuring means for obtaining an actual measuring time $T_k$ and an average received signal level $Q_k$ (k=1, 2, ...) in a predetermined measuring period T;

means for calculating a total measuring time $t_k$ which is a sum total of the actual measuring time $T_k$;

means for obtaining a measuring error $\Delta D_k$ of an average received signal level in the total measuring time $t_k$;

storing means for storing a total measuring time $t_{k-1}$ and a corrected average received signal level $R_{k-1}$ at the end of a preceding measuring period of the mobile station;

means for extracting a transmission power control amount $\Delta P_{k-1}$ from a signal transmitted from the base station to the mobile station;

means for obtaining a corrected average received signal level $R_k$ at the end of a present measuring period of the mobile station on the basis of the corrected average received signal level $R_{k-1}$, the transmission power control amount $\Delta P_{k-1}$, the total measuring time $t_{k-1}$, the average received signal level $Q_k$, the actual measuring time $T_k$ and the total measuring time $t_k$; and transmission means for informing the base station of the corrected average received signal level $R_k$.

In a sixth aspect of the present invention, there is provided a base station in a mobile satellite communication system in which a base station is connected with a mobile station via a communication satellite, the base station comprising:

means for extracting a corrected average received signal level $R_k$ from a received signal sent from the mobile station;, means for calculating a transmission power control amount $\Delta P_k$ of the base station on the basis of a prestored level setting error $\Delta S_k$ and a difference between the corrected average received signal level $R_k$ and a predetermined reference value $R_{ref}$ of the received signal level of the mobile station;

means for obtaining present transmission power $P_k$ from the transmission power control amount $\Delta P_k$ and preceding transmission power $P_{k-1}$, and for controlling the transmission power of the base station by the present transmission power $P_k$; and means for transmitting information on the present transmission power control amount $\Delta P_k$ to the mobile station.

In a seventh aspect of the present invention, there is provided a mobile satellite communication system in which a base station is connected with a mobile station via a communication satellite, the mobile station comprising:

measuring means for obtaining an actual measuring time $T_k$ and an average received signal level $Q_k$ (k=1, 2, ...) in a predetermined measuring period T; and transmission means for informing the base station of the actual measuring time $T_k$ and the average received signal level $Q_k$ and the base station comprising:

means for extracting the actual measuring time $T_k$ and the average received signal level $Q_k$ from a received signal sent from the mobile station;

means for calculating a total measuring time $t_k$ which is a sum total of the actual measuring time $T_k$;

means for obtaining a measuring error $\Delta D_k$ of an average received signal level in the total measuring time $t_k$;

means for obtaining a total error $\Delta E_k$ by adding the measuring error $\Delta D_k$ to a predetermined level setting error $\Delta S_k$;

storing means for storing a total measuring time $t_{k-1}$, a corrected average received signal level $R_{k-1}$ and a transmission power control amount $\Delta P_{k-1}$ at the end of a preceding measuring period of the mobile station;

means for obtaining a corrected average received signal level $R_k$ at the end of a present measuring period of the mobile station on the basis of a predetermined reference value $R_{ref}$ of the received signal level of the mobile station, the total error $\Delta E_k$, the total measuring time $t_{k-1}$, the average received signal level $Q_k$, the actual measuring time $T_k$ and the total measuring time $t_k$ by the following equation;

$$R_k = \{(R_{ref} + \Delta E_{k-1})t_{k-1} + Q_k T_k\}/t_k$$

means for calculating a transmission power control amount $\Delta P_k$ of the base station on the basis of the total error $\Delta E_k$ and a difference between the reference value $R_{ref}$ of the received signal level and the corrected average received signal level $R_k$; and means for obtaining present transmission power $P_k$ from the transmission power control amount $\Delta P_k$ and preceding transmission power $P_{k-1}$, and for controlling the transmission power of the base station by the present transmission power $P_k$.

In an eighth aspect of the present invention, there is provided a mobile satellite communication system in which a base station is connected with a mobile station via a communication satellite, the mobile station comprising:

measuring means for obtaining an actual measuring time $T_k$ and an average received signal level $Q_k$ (k=1, 2, ...) in a predetermined measuring period T;

means for calculating a total measuring time $t_k$ which is a sum total of the actual measuring time $T_k$;

means for obtaining a measuring error $\Delta D_k$ of an average received signal level in the total measuring time $t_k$;

storing means for storing a total measuring time $t_{k-1}$ and a corrected average received signal level $R_{k-1}$ at the end of a preceding measuring period of the mobile station;

means for extracting a transmission power control amount $\Delta P_{k-1}$ from a signal transmitted from the base station to the mobile station;

means for obtaining a corrected average received signal level $R_k$ at the end of a present measuring period of the mobile station on the basis of a reference value $R_{ref}$ of the received signal level of the mobile station, a predetermined level setting error $\Delta S_k$ of the base station, the total measuring time $t_{k-1}$, the average received signal level $Q_k$, the actual measuring time $T_k$ and the total measuring time $t_k$ by the following equation;

$$R_k = \{(R_{ref} + \Delta S_{k-1})t_{k-1} + Q_k T_k\}/t_k$$

transmission means for informing the base station of the corrected average received signal level $R_k$, and the base station comprising:

means for extracting the corrected average received signal level $R_k$ from a received signal sent from the mobile station;

means for calculating the transmission power control amount $\Delta P_k$ of the base station on the basis of the level setting error $\Delta S_k$ and a difference between the corrected average received signal level $R_k$ and the predetermined reference value $R_{ref}$ of the received signal level of the mobile station;

means for obtaining present transmission power $P_k$ from the transmission power control amount $\Delta P_k$ and preceding transmission power $P_{k-1}$, and for controlling the transmission power of the base station by the present transmission power $P_k$; and means for transmitting information on the present transmission power control amount $\Delta P_k$ to the mobile station.

In a ninth aspect of the present invention, there is provided a transmission power control method in a mobile satellite communication system in which a base station is connected with a mobile station via a communication satellite, the method comprising the steps of:

obtaining an actual measuring time $T_k$ and an average received signal level $Q_k$ (k=1, 2, . . . ) in a predetermined measuring period T at the mobile station;

calculating a total measuring time $t_k$ which is a sum total of the actual measuring time $T_k$;

obtaining a measuring error $\Delta D_k$ of an average received signal level in the total measuring time $t_k$;

storing a total measuring time $t_{k-1}$, a corrected average received signal level $R_{k-1}$ and a transmission power control amount $\Delta P_{k-1}$ at the end of a preceding measuring period of the mobile station;

obtaining a corrected average received signal level $R_k$ at the end of a present measuring period of the mobile station on the basis of the corrected average received signal level $R_{k-1}$, the transmission power control amount $\Delta P_{k-1}$, the total measuring time $t_{k-1}$, the average received signal level $Q_k$, the actual measuring time $T_k$ and the total measuring time $t_k$;

calculating a transmission power control amount $\Delta P_k$ of the base station on the basis of the measuring error $\Delta D_k$ and a difference between the corrected average received signal level $R_k$ and a predetermined reference value $R_{ref}$ of the received signal level of the mobile station; and obtaining present transmission power $P_k$ from the transmission power control amount $\Delta P_k$ and preceding transmission power $P_{k-1}$, and for controlling the transmission power of the base station by the present transmission power $P_k$.

According to the present invention, the total measuring time is obtained by sequentially summing up the actual measuring time. In addition, the corrected average received signal level during the total measuring time at the mobile station is calculated. In the mobile satellite communication system, it is known that the measuring error of the received signal level is inversely proportional to the square root of the measuring time. Consequently, the system in accordance with the present invention can reduce the measuring error of the received signal level in comparison with the conventional system which obtains the average received signal level in individual measuring periods, thereby implementing accurate transmission power control.

The above and other objects, effects, features and advantages of the present invention will become more apparent from the following description of the embodiments thereof taken in conjunction with the accompanying drawings.

BRIEF DESCRIPTION OF THE DRAWINGS

FIG. 6 is a schematic diagram illustrating a format of received signal level information;

DETAILED DESCRIPTION OF PREFERRED EMBODIMENTS

The invention will now be described with reference to the accompanying drawings.

EMBODIMENT 1

Figure 4:
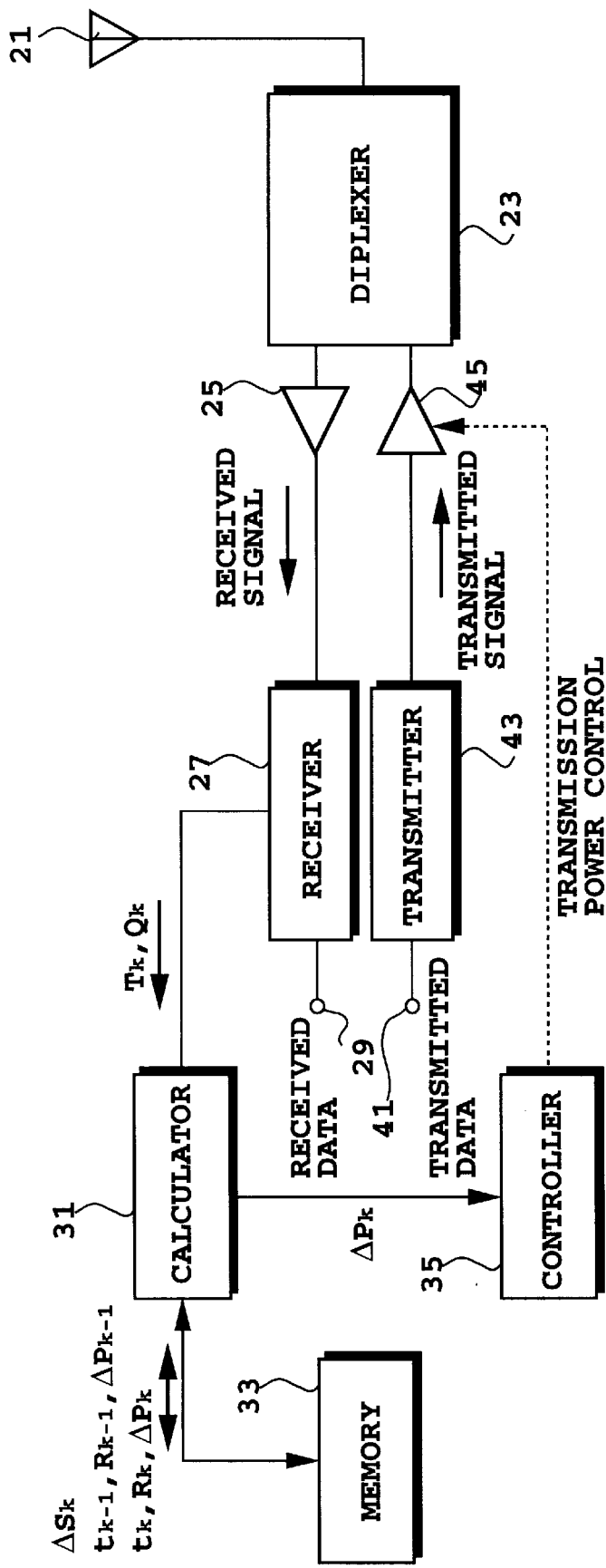
FIG. 4 is a block diagram showing a base station in a first embodiment of a mobile satellite communication system in accordance with the present invention.
Figure 5:
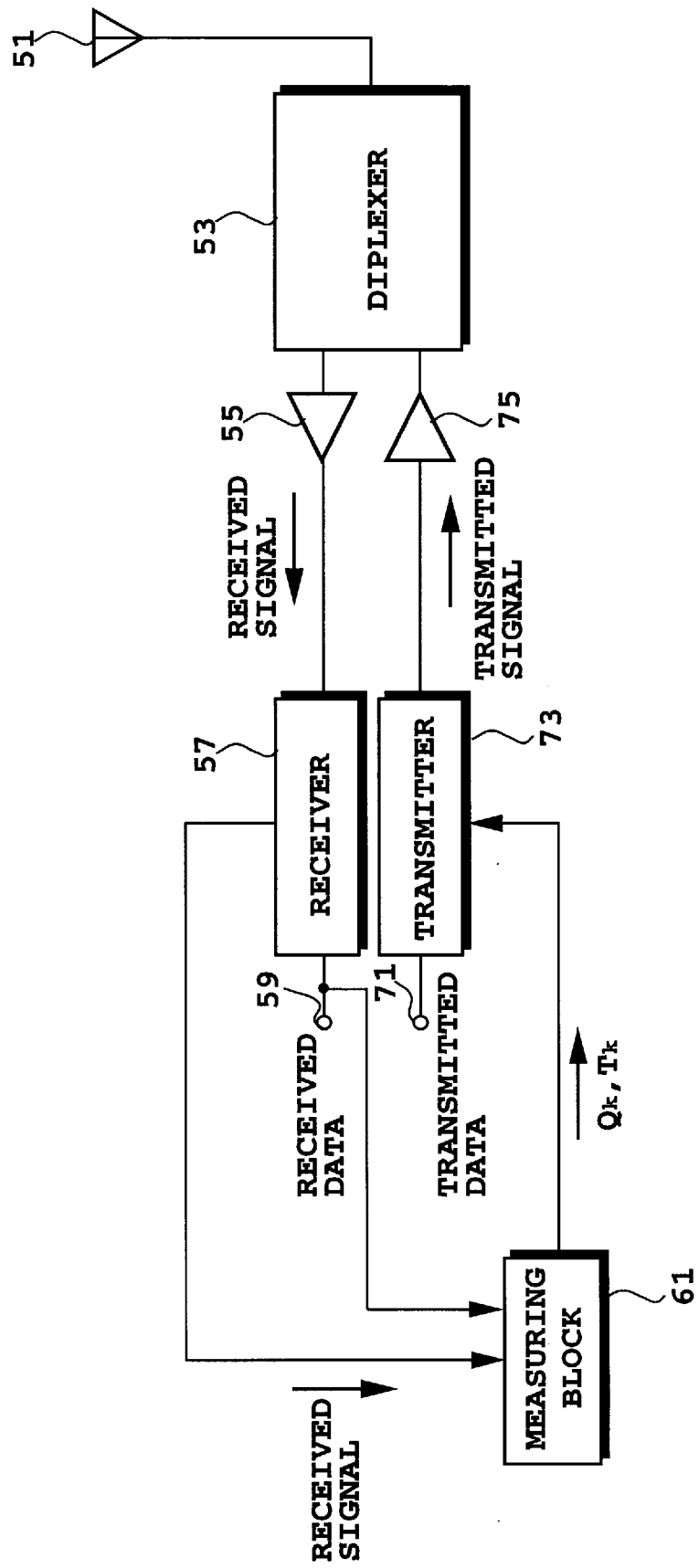
FIG. 5 is a block diagram showing a mobile station in the first embodiment of a mobile satellite communication system in accordance with the present invention.

FIGS. 4 and 5 are block diagrams showing a first embodiment of a mobile satellite communication system in accordance with the present invention, where FIG. 4 shows a base station, and FIG. 5 shows a mobile station.

Before explaining the base station and the mobile station, technical terms used in the specification will be described. A mobile station measures a received signal level at a constant measuring period T. In the mobile communications, VOX (Voice Operated Transmission) is usually employed, and a carrier is emitted only when a speech spurt is present. Thus, the mobile station does not receive the radio wave continuously from the base station. Taking account of this, the time during which the radio wave is actually received in the measuring period is referred to as an actual measuring time $T_k$ in this specification, where k is the number indicating measuring sequence and taking values of 1, 2, 3, . . . An average received signal level during the measuring period T, that is, a value obtained by dividing a time integral of the measured received signal level by the actual measuring time $T_k$ is referred to as an average received signal level $Q_k$. In addition, the sum total of the actual measuring times $T_k$ is referred to as a total measuring time $t_k$. A corrected value of the average received signal level calculated over the total measuring time $t_k$ is referred to as a corrected average received signal level $R_k$.

In FIG. 4, a signal transmitted from a mobile station is received by an antenna 21, and is fed to a receiving amplifier 25 via a diplexer 23. The received signal amplified by the receiving amplifier 25 is detected and demodulated by a receiver 27, and is outputted from an output terminal 29 of the receiver as received data. The receiver 27 also extracts an average received signal level $Q_k$ and an actual measuring time $T_k$ from the received signal.

FIG. 6 is a schematic diagram showing a format of a signal SG including the information on the average received signal level $Q_k$ and the actual measuring time $T_k$. The signal SG is inserted into the received signal, and contains a signal identifier ID indicating the type of the signal, and information on the average received signal level $Q_k$ and the actual measuring time $T_k$.

Returning to FIG. 4, the receiver 27 extracts the signal SG from the received signal, and supplies a calculator 31 with the average received signal level $Q_k$ and the actual measuring time $T_k$. The calculator 31 calculates, in a manner which will be described later, a total measuring time $t_k$, a corrected average received signal level $R_k$, a received signal level measuring error $\Delta D_k$, a total error $\Delta E_k$ and a transmission power control amount $\Delta P_k$. Part of the calculation results is fed to a memory 33 and a controller 35. The memory 33 stores the latest data on the total measuring time and the corrected average received signal level.

The controller 35 calculates transmission power $P_k$ on the basis of the transmission power control amount $\Delta P_k$ fed from the calculator 31, details of which will also be described later.

Transmission data inputted to an input terminal 41 of a transmitter 43 is framed into a predetermined format, and is modulated and fed to a transmitting amplifier 45 as a transmitted signal. The transmitting amplifier 45 supplies the antenna 21 via the diplexer 23 with the transmission signal having transmission power determined by a transmission power control signal fed from the controller 35, thereby transmitting it to mobile stations.

A mobile station as shown in FIG. 5 receives the signal from the base station by an antenna 51. The received signal is fed to a receiver 57 through a diplexer 53 and a receiving amplifier 55. The receiver 57 demodulates the received signal, and outputs the demodulated data (received data) from an output terminal 59 of the receiver. The receiver 57 also supplies a measuring block 61 with the received data and the received signal.

The measuring block 61 measures the level of the received signal, obtains the average received signal level $Q_k$ at each measuring period T determined in advance, and feeds the average received signal level $Q_k$ and the actual measuring time $T_k$ to a transmitter 73.

A transmitter 73 inserts the average received signal level $Q_k$ and the actual measuring time $T_k$ into the transmitted data inputted to an input terminal 71 of the transmitter in the fashion as shown in FIG. 6, and provides it to a transmitting amplifier 75 as a transmitted signal. The transmitting amplifier 75 supplies the transmitted signal to the antenna 51 via the diplexer 53, thereby transmitting it to the base station.

Figure 7:
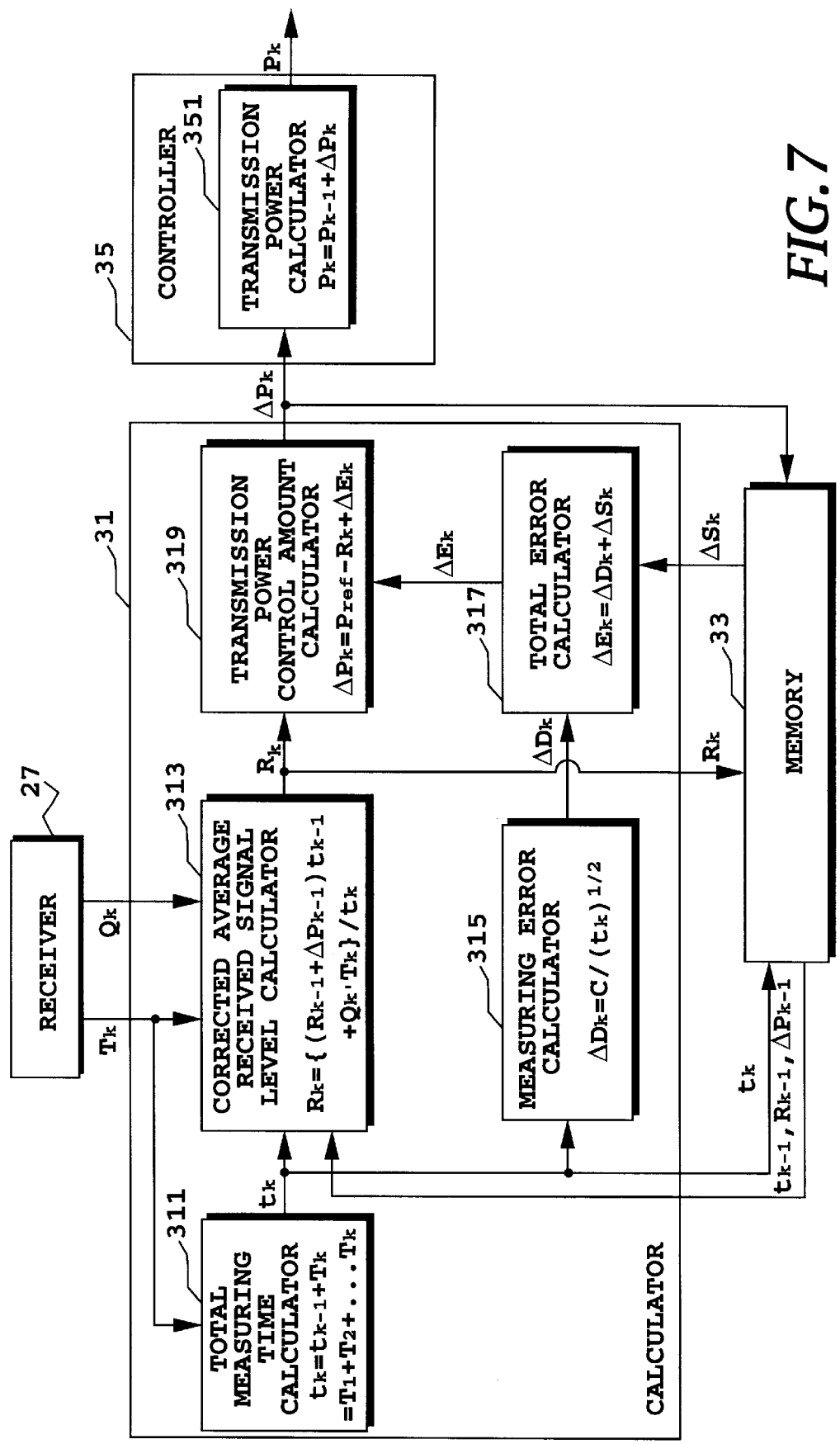
FIG. 7 is a block diagram showing an internal configuration of a calculator and a controller in the base station of the first embodiment.

FIG. 7 is a block diagram showing the calculator 31 and the controller 35 of the base station.

The calculator 31 includes a total measuring time calculator 311, a corrected average received signal level calculator 313, a measuring error calculator 315, a total error calculator 317 and a transmission power control amount calculator 319.

The total measuring time calculator 311 sequentially sums up the actual measuring time $T_k$ which is sent from the mobile station and is fed via the receiver 27 of the base station, thereby obtaining the total measuring time $t_k$ equal to the sum total of the actual measuring times $T_k$. The total measuring time $t_k$ is fed to the corrected average received signal level calculator 313, the measuring error calculator 315 and the memory 33.

The measuring error calculator 315 calculates a measuring error $\Delta D_k$ at the mobile station over the total measuring time $t_k$. It is known that the measuring error $\Delta D_k$ is inversely proportional to the square root of the measuring time (Nishi, et al. "Beam Selection Characteristics in Multi-Beam Mobile Satellite Communications", Technical Report of the Institute of Electronics, Information and Communication Engineers of Japan, SAT-89-50,1989-11). Therefore the measuring error $\Delta D_k$ is expressed by the following equation.

$$\Delta D_k = C/(t_k)^{1/2} \tag{1}$$

where C is a measuring error coefficient obtained from a ratio between the direct wave and the reflected waves from the satellite to the mobile station, and can be set in advance. As is seen from this equation, an increasing measuring time results in a smaller measuring error $\Delta D_k$. The measuring error $\Delta D_k$ is fed to the total error calculator 317.

The corrected average received signal level calculator 313 calculates the corrected average received signal level $R_k$ given by the following equation.

$$R_k = \{(R_{k-1} + \Delta P_{k-1})t_{k-1} + Q_k T_k\}/t_k \tag{2}$$

In other words, the corrected average received signal level calculator 313 obtains the present corrected average received signal level $R_k$ by taking a time average between the present average received signal level $Q_k$ and the sum of the corrected average received signal level $R_{k-1}$ until the end of the preceding measurement and the preceding transmission power control amount $\Delta P_{k-1}$. Here, the total measuring time $t_{k-1}$, the corrected average received signal level $R_{k-1}$ and the transmission power control amount $\Delta P_{k-1}$ at the end of the preceding measurement are fed from the memory 33. The total measuring time $t_k$ until the end of the present measurement is fed from the total measuring time calculator 311, and the present actual measuring time $T_k$ and average received signal level $Q_k$ are fed from the receiver 27.

The total error calculator 317 calculates the total error $\Delta E_k$ by the following equation.

$$\Delta E_k = \Delta D_k + \Delta S_k \tag{3}$$

where $\Delta S_k$ is a level setting error due to step value errors of an attenuator for adjusting the transmission power of the base station, and can be set in advance. The level setting error $\Delta S_k$ is fed from the memory 33. The total error $\Delta E_k$ is supplied to the transmission power control amount calculator 319.

The transmission power control amount calculator 319 calculates the present transmission power control amount $\Delta P_k$ given by the following equation.

$$\Delta P_k = R_{ref} - R_k + \Delta E_k \tag{4}$$

where $R_{ref}$ is a preset reference value of the received signal level at the mobile station. In other words, the present transmission power control amount $\Delta P_k$ is obtained by subtracting the present corrected average received signal level from the sum of the reference value of received signal level and the total error. The transmission power control amount $\Delta P_k$ is fed to the controller 35.

The controller 35 includes a transmission power calculator 351. The transmission power calculator 351 calculates the present transmission power $P_k$ by the following equation.

$$P_k = P_{k-1} + \Delta P_k \tag{5}$$

In other words, it obtains the present transmission power $P_k$ by adding the present transmission power control amount $\Delta P_k$ to the preceding transmission power $P_{k-1}$. The transmission power $P_k$ is fed to the transmitting amplifier 45 so that the transmission power thereof equals the transmission power $P_k$.

The thus obtained corrected average received signal level $R_k$, transmission power control amount $\Delta P_k$ and total measuring time $t_k$ are stored in the memory 33. These data are necessary for calculating the next corrected average received signal level.

Figure 8:
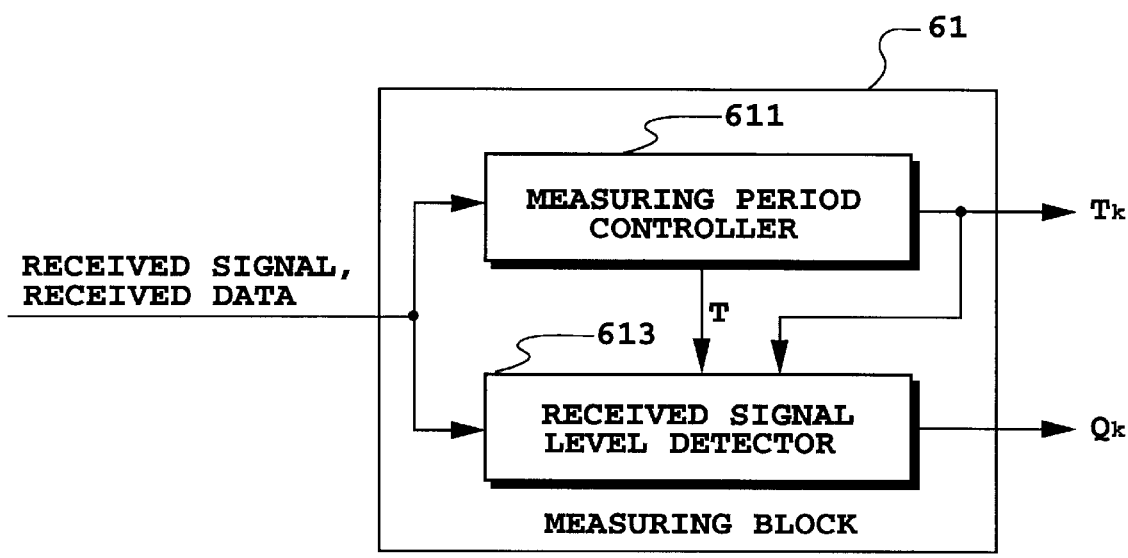
FIG. 8 is a block diagram showing an internal configuration of a measuring block in the mobile station of the first embodiment.

FIG. 8 is a block diagram showing the internal configuration of the measuring block 61 of the mobile station. The measuring block 61 includes a measuring period controller 611 and a received signal level detector 613.

The measuring period controller 611 extracts the frame period from the received signal, and multiplies it by a predetermined integer to obtain the measuring period. The measuring period controller 611 also measures the actual measuring time $T_k$ by searching the VOX control signal. Since the VOX is controlled on the frame basis, the actual measuring time $T_k$ can be measured by counting the number of frames including speech spurts, and by multiplying that number by the length of the received frame. The measuring period controller 611 provides the measuring period T and the actual measuring time $T_k$ to the received signal level detector 613.

The received signal level detector 613 measures the received signal level L(t) in each measuring period fed from the measuring period controller 611, and obtains the average received signal level $Q_k$. The average received signal level $Q_k$ can be obtained either by dividing the time integral of the received signal level L(t) by the actual measuring time $T_k$, or by measuring the bit error rate at every measuring period, and converting it into the received signal level by using a conversion table prestored in the mobile station, either of which can be readily implemented.

Figure 9:
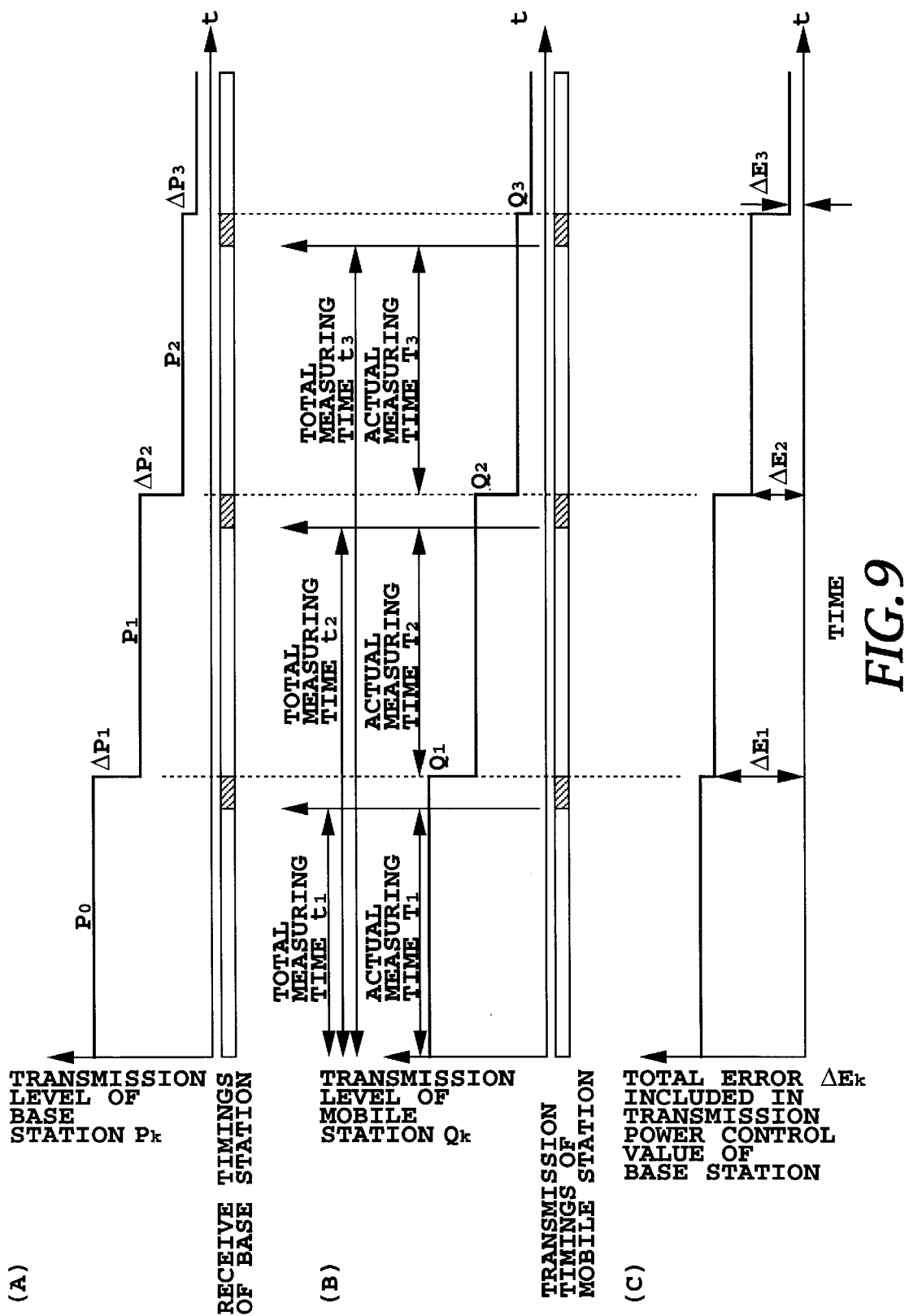
FIG. 9 is a diagram illustrating an example of transmission power control timings on a forward link channel in the first embodiment.

Next, the outline of the operation of this embodiment will be described with reference to FIG. 9. In the following description, the parameters at the measuring period k (k=1, 2, 3, . . . ) are defined as follows as described before: the transmission power of the base station is $P_k$; the actual measuring time of the mobile station is $T_k$; the average received signal level in the actual measuring time $T_k$ is $Q_k$; the total measuring time until the end of the measuring period k is $t_k$; and the corrected average received signal level in the total measuring time $t_k$ is $R_k$. In addition, the measuring period is denoted by T (a fixed value). Incidentally, the actual measuring time $T_k$ and the total measuring time $t_k$ as shown in FIG. 9 depend on the time in which the radio wave is actually received as described before. Accordingly, they will become shorter than are indicated in FIG. 9.

As shown in FIG. 9(B), the mobile station measures the received signal level at every measuring period k independently, and calculates the average value thereof. The mobile station informs the base station of the average received signal level $Q_k$ thus obtained together with the actual measuring time $T_k$ each time they are obtained. In other words, the base station receives the average received signal level $Q_k$ and the actual measuring time $T_k$ at every measuring period.

Figures 1A, 1B:
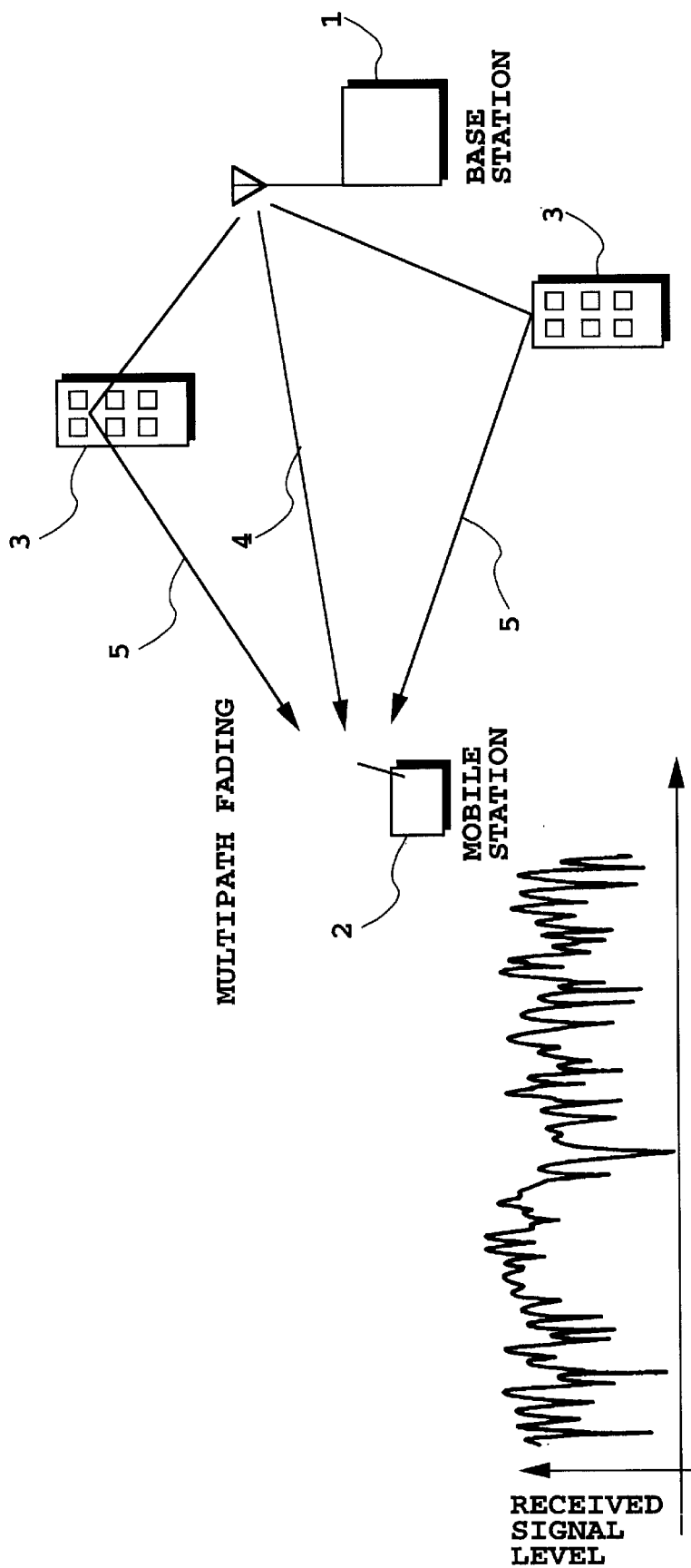
FIG. 1A is a schematic diagram illustrating multipath fading in a cellular system.
FIG. 1B is a graph illustrating received signal level variations at a mobile station in the cellular system.
Figure 2:
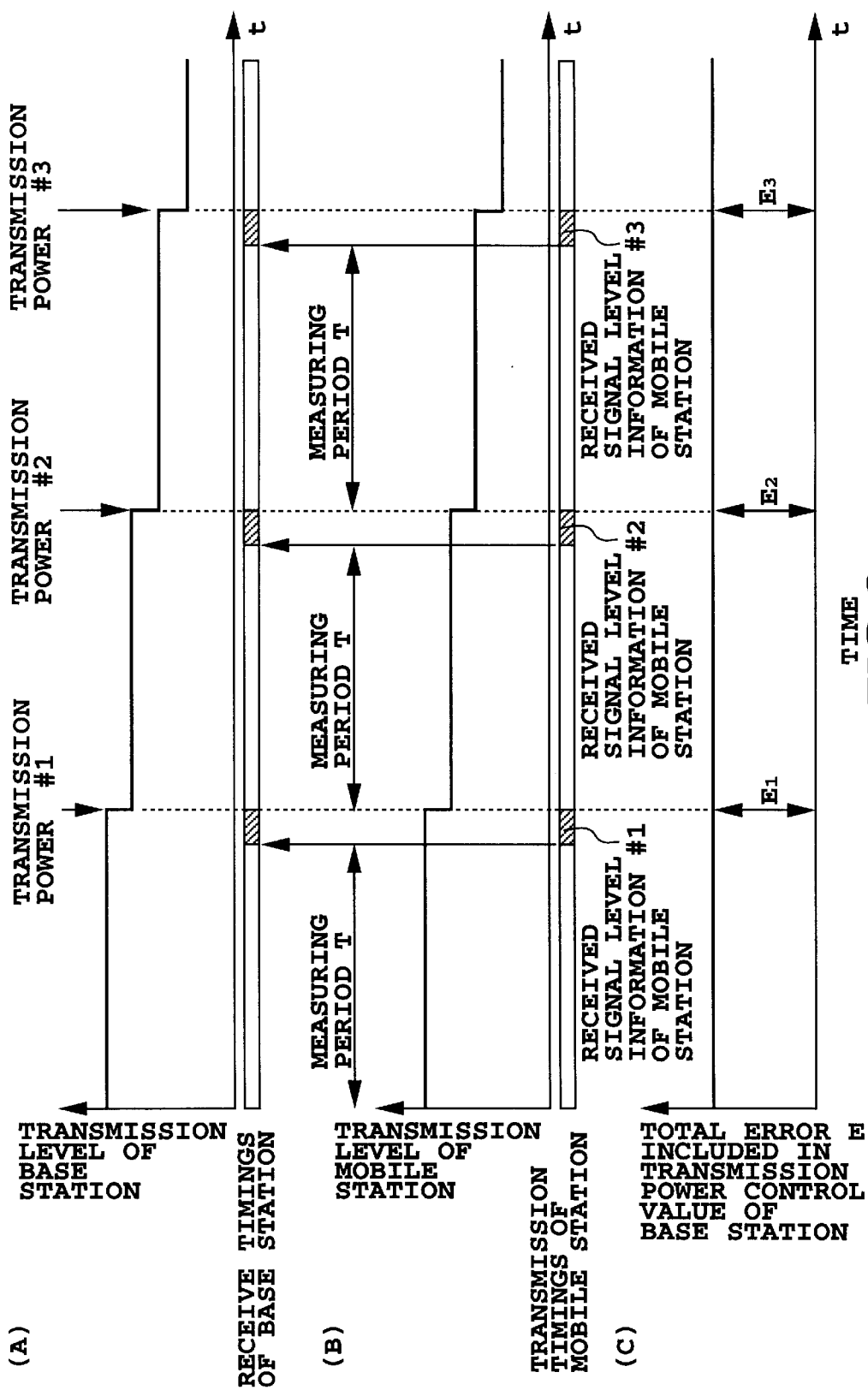
FIG. 2 is a diagram showing an example of transmission power control timings on a forward link channel in the cellular system.
Figure 3A:
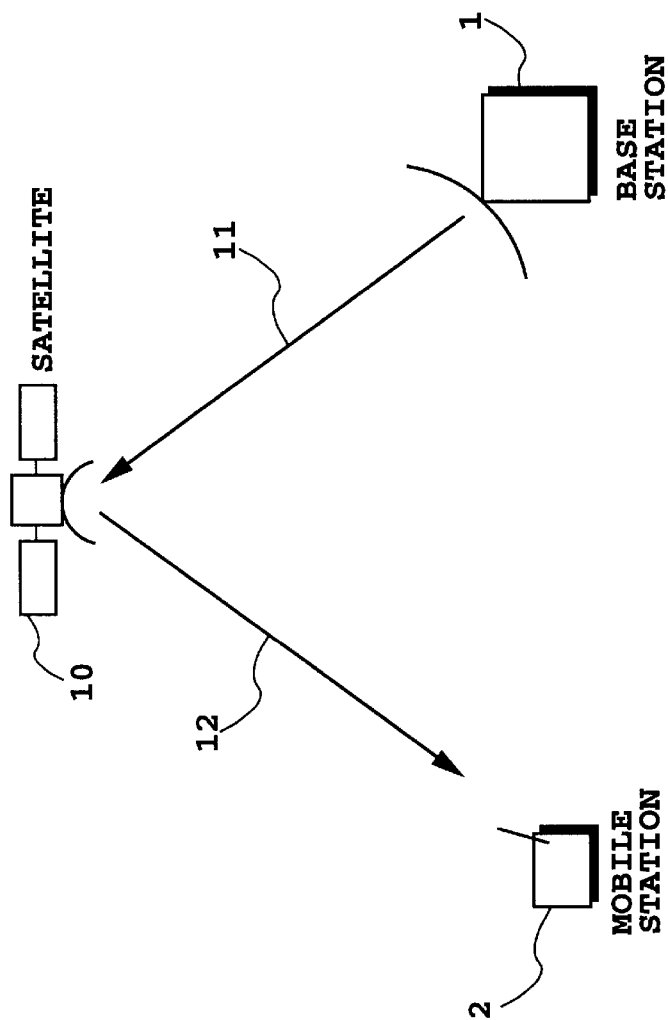
FIG. 3A is a schematic diagram illustrating the behavior of radio-wave propagation characteristics in a mobile satellite communication system.
Figure 3B:
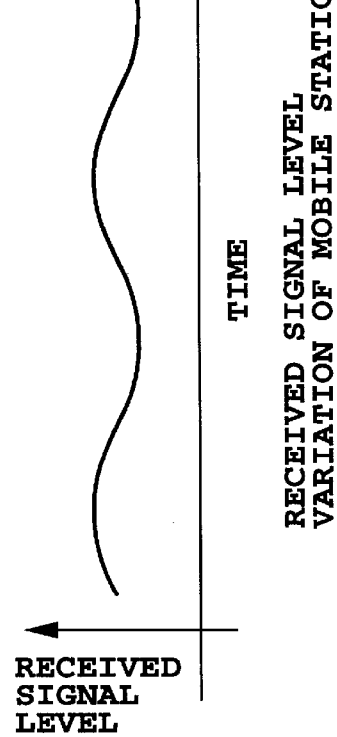
FIG. 3B is a graph illustrating received signal level variations at a mobile station in the mobile satellite communication system.

The base station sums up the received actual measuring time $T_k$ to obtain the total measuring time $t_k$, calculates the corrected average received signal level $R_k$ in the total measuring time $t_k$ and the measuring error $\Delta D_k$, and determines the transmission power $P_k$ on the basis of these values. It is known that the measuring error of the average received signal level is inversely proportional to the square root of the measuring time in the mobile satellite communication system as mentioned before. Accordingly, the measuring error will decrease as the measuring time grows longer. Thus, the total error $\Delta E_k$ contained in the transmission power control amount of the base station gradually decreases as shown in FIG. 9(C). Hence, the received signal level of the mobile station converges to a desired value in a shorter time than in the conventional mobile station as shown in FIG. 2.

Figure 10:
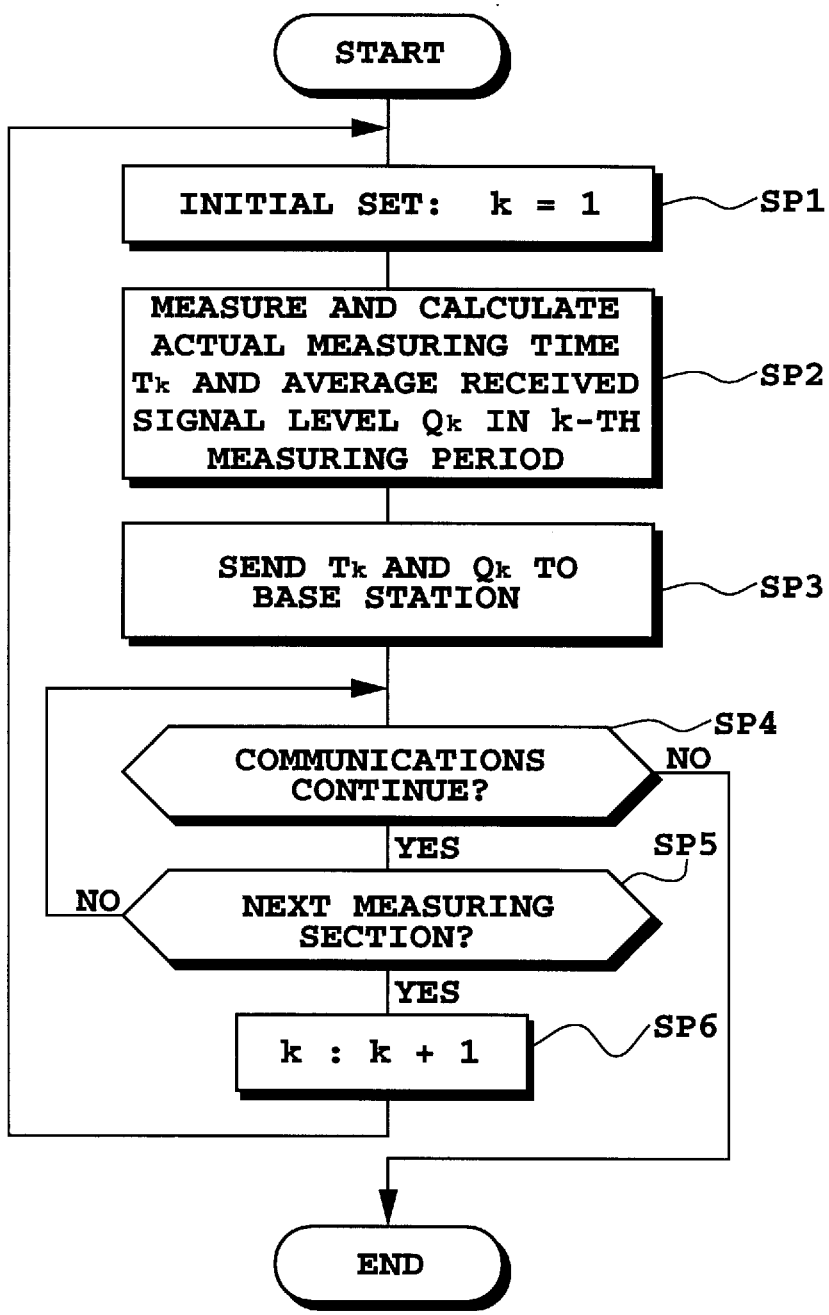
FIG. 10 is a flowchart showing the operation of the mobile station of the first embodiment.
Figure 11:
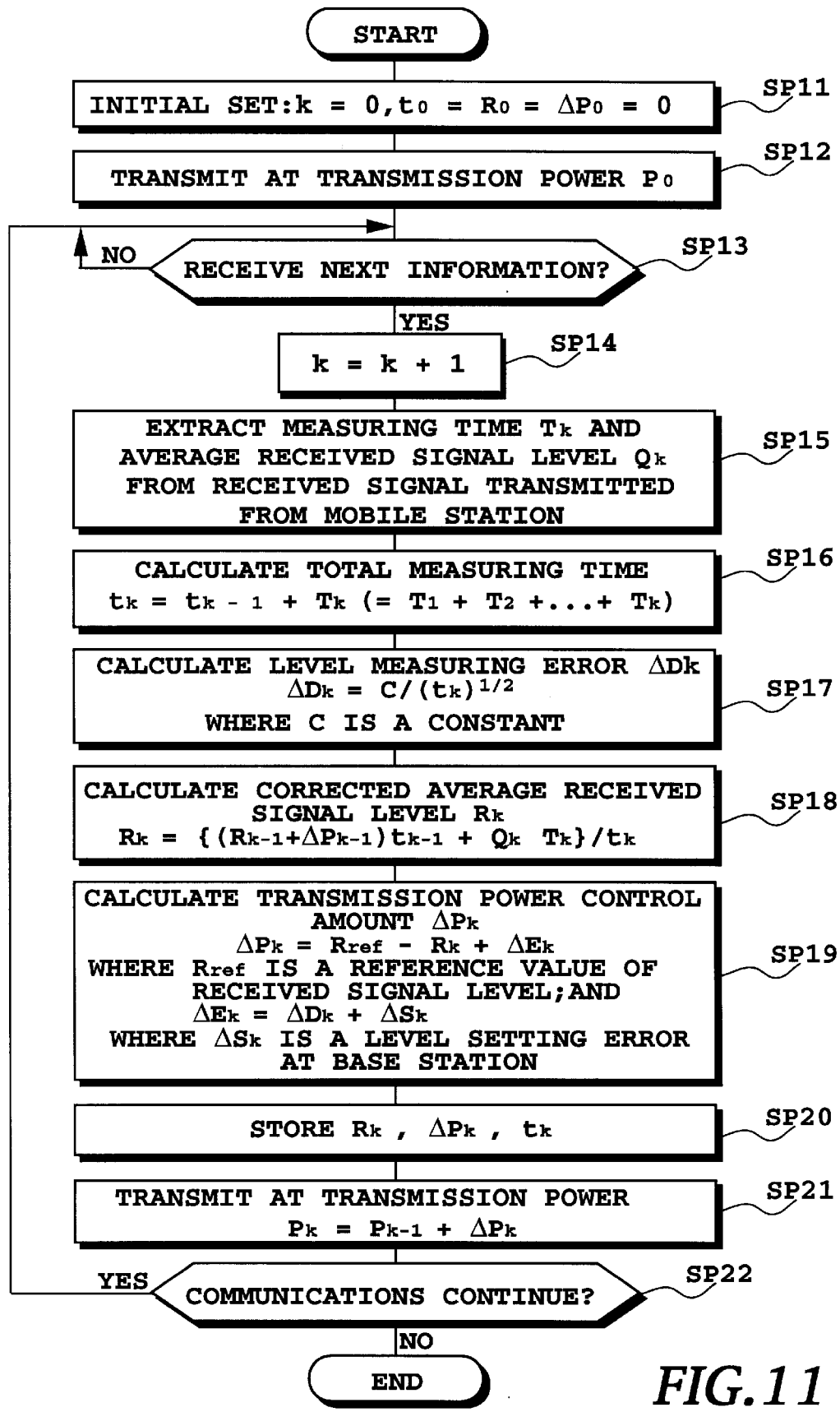
FIG. 11 is a flowchart showing the operation of the base station of the first embodiment.

FIGS. 10 and 11 are flowcharts showing details of the above-mentioned operation of the transmission power control, where FIG. 10 shows the operation of the mobile station, and FIG. 11 shows that of the base station. Although it will be necessary to consider a propagation delay in a practical system because the propagation delay is large in the mobile satellite communications, the delay is not considered in the following description because it can be readily compensated.

I. Control procedure of the mobile station.

The measuring block 61 initiates the measurement of the average received signal level simultaneously with the start of communications. More specifically, at step SP1 of FIG. 10, the measuring block 61 sets the measuring period number k at k=1. At step SP2, it measures the actual measuring time $T_k$ and the average received signal level $Q_k$ in every predetermined measuring period T. The average received signal level $Q_k$ is provided to the base station together with the actual measuring time $T_k$ through the transmitter 73 at step SP3. The processing is continued until the end of the communications is detected at step SP4. More specifically, each time the measuring block 61 detects the passing of the measuring period T at step SP5, it increments the measuring period number k at step SP6, and continues the measurement at step SP2 during the communications. Thus, the average received signal levels $Q_1, Q_2, \ldots$ and the actual measuring times $T_1, T_2, \ldots$, when the base station transmits at the transmission power $P_0, P^1, \ldots$ are sent from the mobile station to the base station. They are sent in the format as shown in FIG. 6 as described before.

II. Control procedure of the base station

1. Initial procedure

After completing the initial set at step SP11 of FIG. 11, the base station starts transmission at predetermined initial transmission power $P_0$ at step SP12. The base station keeps this transmission power until it receives the first information on the average received signal level $Q_1$ from the mobile station. As the initial transmission power, the maximum transmission power of the base station or transmission power determined in advance in accordance with the type of the mobile station is available.

2. The k-th transmission power control procedure

The receiver 27 of the base station decides whether the next information is received or not from the mobile station at step SP13. Upon receiving the next information, the receiver 27 increments the measuring period number k by one at step SP14, and extracts at step SP15 the k-th average received signal level $Q_k$ and actual measuring time $T_k$ sent from the mobile station, and supplies them to the calculator 31.

The total measuring time calculator 311 of the calculator 31 computes the total measuring time $t_k$ at step SP16. It is obtained by adding the present actual measuring time $T_k$ to the preceding total measuring time $t_{k-1}$. The measuring error calculator 315 of the calculator 31 computes the measuring error $\Delta D_k$ of the mobile station at step SP17, and the corrected average received signal level calculator 313 calculates the corrected average received signal level $R_k$ at step SP18. In addition, the transmission power control amount calculator 319 of the calculator 31 computes the present transmission power control amount $\Delta P_k$ at step SP19. The corrected average received signal level $R_k$, transmission power control amount $\Delta P_k$ and total measuring time $t_k$ are stored in the memory 33 at step SP20. These values are necessary for calculating the next corrected average received signal level. At step SP21, the transmission power calculator 351 computes the present transmission power $P_k$, and controls the transmitting amplifier 45 such that its transmission power is adjusted to this value.

At step SP22, the receiver 27 detects whether or not the communications continue, and terminates the processing if it detects the end of the communications. On the other hand, if the communications continue, the receiver returns its control to step SP13, and awaits the next information from the mobile station. Upon receiving the next information, the receiver 27 increments k at step SP14, and repeats similar procedures.

Since the present embodiment employs the corrected average received signal level $R_k$ over the total measuring time $t_k$ instead of the average received signal level $Q_k$ in the actual measuring time $T_k$ in calculating the transmission power, the measuring time for calculating the average received signal level grows longer. As a result, the present invention can obtain more accurate transmission power than the conventional system.

Although the present embodiment obtains the corrected average received signal level $R_k$ by equation (2), a calculation method is not limited to this. For example, noticing the first term of the right-hand side of equation (2) and equation (4), it is seen that the following equation holds.

$$R_{k-1} + \Delta P_{k-1} = R_{ref} + \Delta E_{k-1} \tag{6}$$

Substituting the right-hand side of this equation into equation (2) will result in the corrected average received signal level $R_k$. That is, the corrected average received signal level $R_k$ can be obtained by the following equation.

$$R_k \{(R_{ref} + \Delta E_{k-1}) t_{k-1} + Q_k T_k \}/t_k \tag{7}$$

In this case, it is enough that the total error $\Delta E_k$ is stored instead of the left-hand side of equation (6).

EMBODIMENT 2

Figure 12:
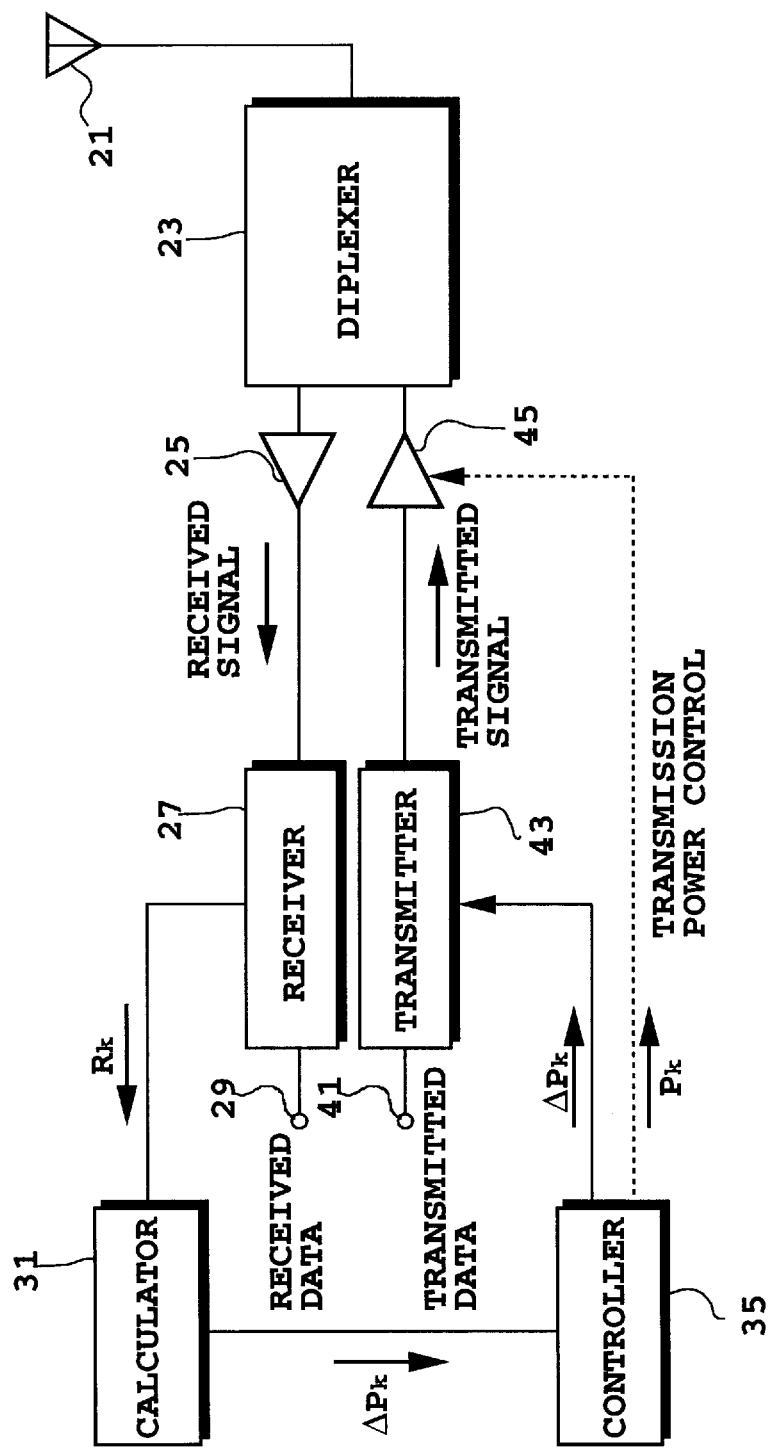
FIG. 12 is a block diagram showing a base station in a second embodiment of a mobile satellite communication system in accordance with the present invention.
Figure 13:
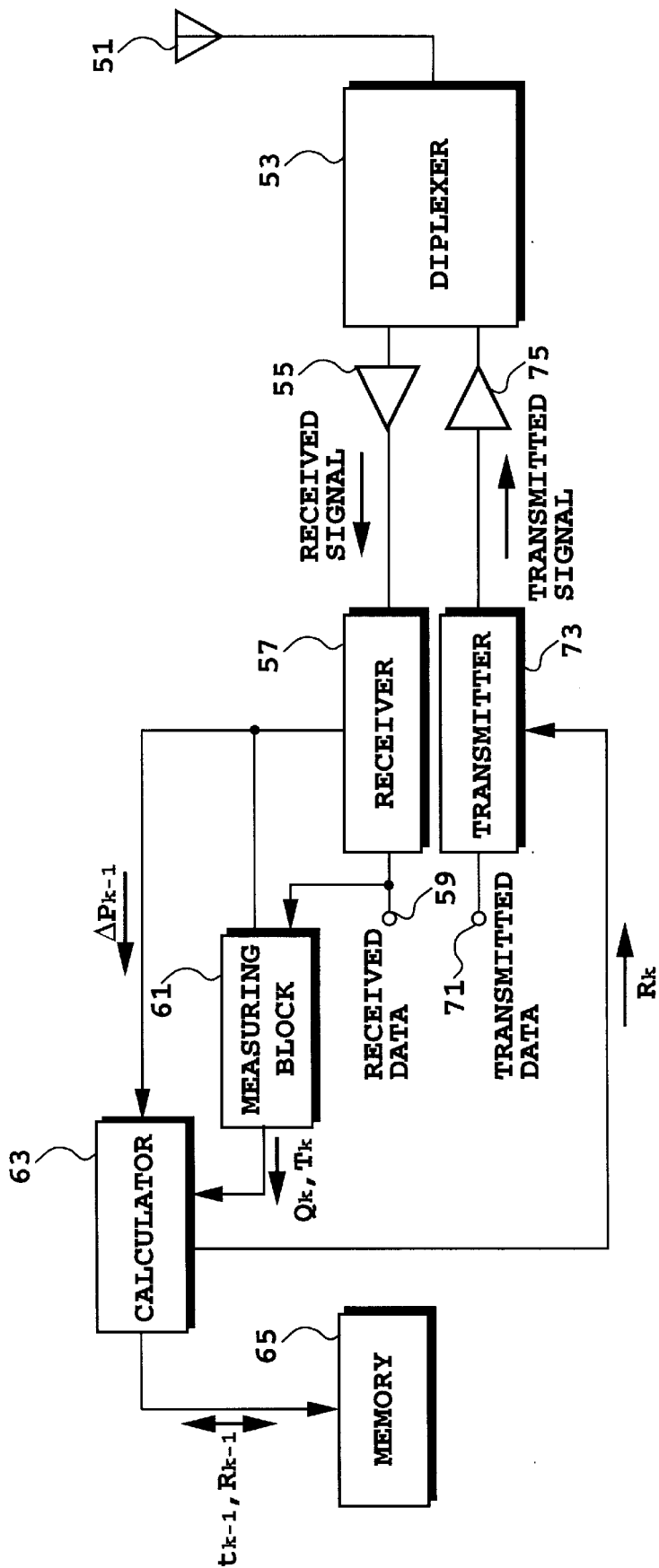
FIG. 13 is a block diagram showing a mobile station in the second embodiment of a mobile satellite communication system in accordance with the present invention.

FIGS. 12 and 13 are block diagrams showing a second embodiment of a mobile satellite communication system in accordance with the present invention, wherein FIG. 12 shows a base station and FIG. 13 shows a mobile station. In this embodiment, the corrected average received signal level $R_k$ and the measuring error $\Delta D_k$ are obtained at the mobile station side, and then transmitted to the base station. This embodiment basically differs from the first embodiment in the following.

(1) The memory 33 of the base station is obviated.
(2) The controller 35 of the base station obtains the present transmission power $P_k$ by summing up the transmission power control amount $\Delta P_k$ and the preceding transmission power $P_{k-1}$, and transmits the transmission power control amount $\Delta P_k$ to the mobile station through the transmitter 43.
(3) The mobile station is provided with a calculator 63 and a memory 65.
(4) The calculator 63 obtains the present corrected average received signal level $R_k$ from the actual measuring time $T_k$ and average received signal level $Q_k$ fed from a measuring block 61, the preceding corrected average received signal level $R_{k-1}$ and total measuring time $t_{k-1}$ stored in the memory 65, and the transmission power control amount $\Delta P_{k-1}$ fed from the receiver 57.
(5) The mobile station transmits the corrected average received signal level $R_k$ to the base station through a transmitter 73.

Figure 14:
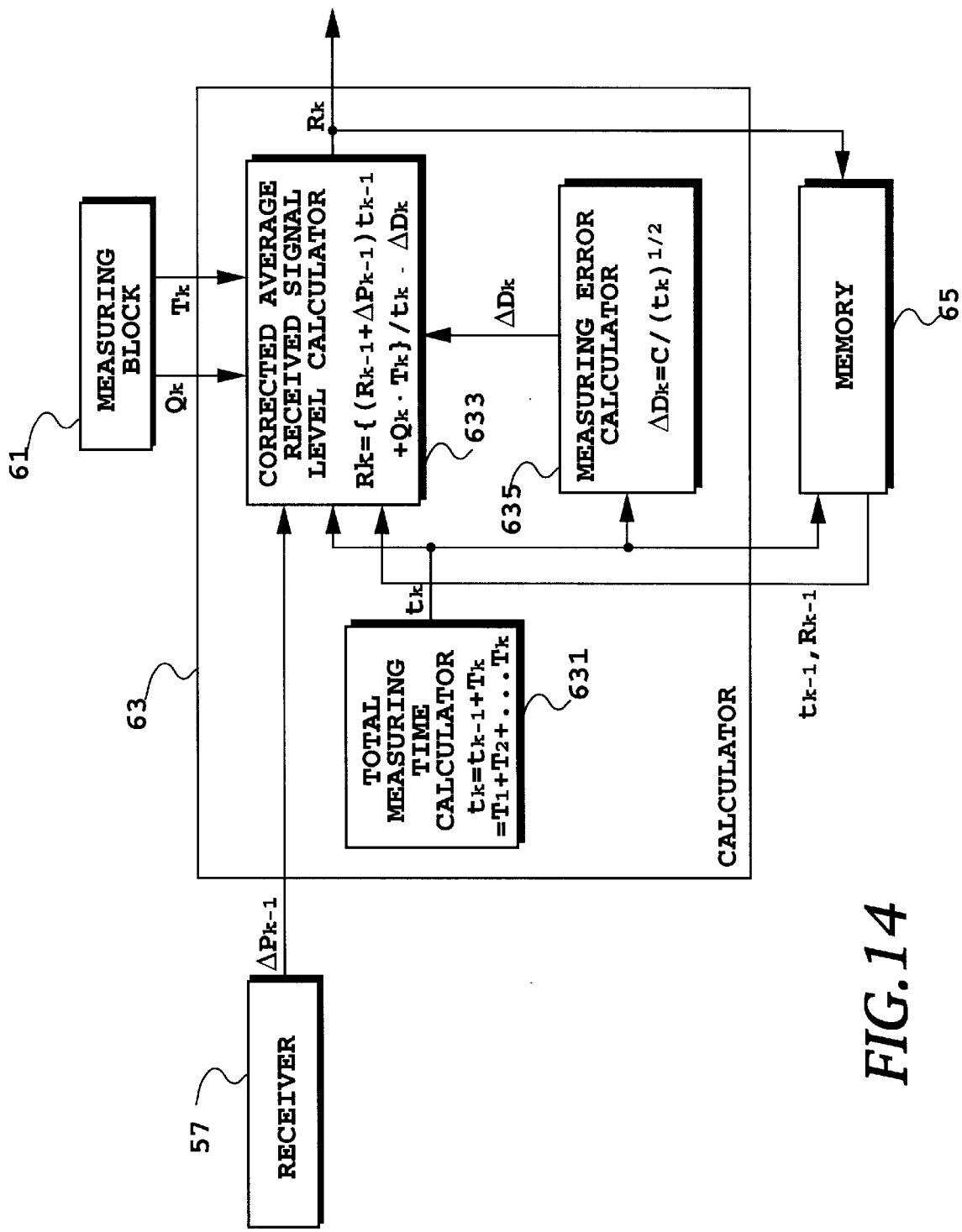
FIG. 14 is a block diagram showing an internal configuration of a calculator in the mobile station of the second embodiment.

FIG. 14 is a block diagram showing the internal configuration of the calculator 63 of the mobile station.

The calculator 63 includes a total measuring time calculator 631, a corrected average received signal level calculator 633, and a measuring error calculator 635.

The total measuring time calculator 631 calculates the total measuring time $t_k$, the total sum of the actual measuring time $T_k$. The total measuring time $t_k$ is fed to the corrected average received signal level calculator 633, the measuring error calculator 635 and the memory 65. The measuring error calculator 635 calculates the measuring error $\Delta D_k$ of the mobile station over the total measuring time $t_k$. The functions of the calculators 631 and 635 are similar to those of their counterparts 311 and 315 in the base station of the first embodiment.

The corrected average received signal level calculator 633 calculates the corrected average received signal level $R_k$ given by the following equation.

$$R_k = \{(R_{k-1} + \Delta P_{k-1}) t_{k-1} + Q_k T_k \}/t_k - \Delta D_k \tag{8}$$

In other words, the corrected average received signal level calculator 633 obtains the present corrected average received signal level $R_k$ by calculating the time average of the present average received signal level $Q_k$ and the sum of the corrected average received signal level $R_{k-1}$ and the transmission power control amount $\Delta P_{k-1}$ at the end point of the preceding measurement, and by subtracting the measuring error $\Delta D_k$ from its result. Here, the total measuring time $t_{k-1}$ and the corrected average received signal level $R_{k-1}$ at the end of the preceding measurement are fed from the memory 65. The transmission power control amount $\Delta P_{k-1}$, which is sent from the base station, is fed from the receiver 57. In addition, the measuring error $\Delta D_k$ is fed from the measuring error calculator 635, the total measuring time $t_k$ until the end of the present measurement is fed from the total measuring time calculator 631, and the present actual measuring time $T_k$ and the present average received signal level $Q_k$ are fed from the measuring block 61.

The corrected average received signal level $R_k$ and the total measuring time $t_k$ thus obtained are stored in the memory 65. These are necessary for calculating the next corrected average received signal level.

On the other hand, the calculator 31 of the base station computes the present transmission power control amount $\Delta P_k$ given by the following equation.

$$\Delta P_k = R_{ref} - R_k + \Delta S_k \tag{9}$$

where $\Delta S_k$ is a level setting error due to the step values of an attenuator for controlling the transmission power of the base station. Thus, the present transmission power control amount $\Delta P_k$ is calculated by adding the received signal level reference value and the level setting error, and by subtracting from the sum the present corrected average received signal level $R_k$.

The controller 35 of the base station calculates the present transmission power $P_k$ by the following equation.

$$P_k = P_{k-1} + \Delta P_k \tag{10}$$

In other words, the present transmission power $P_k$ is obtained by adding the present transmission power control amount $\Delta P_k$ to the preceding transmission power $P_{k-1}$. Then, the transmitting amplifier 45 is controlled such that its transmission power becomes The transmitter 43 of the base station transmits the transmission power control amount $\Delta P_k$ fed from the controller 35 to the mobile station. This value is needed when the mobile station calculates the corrected average received signal level $R_k$.

Figure 15:
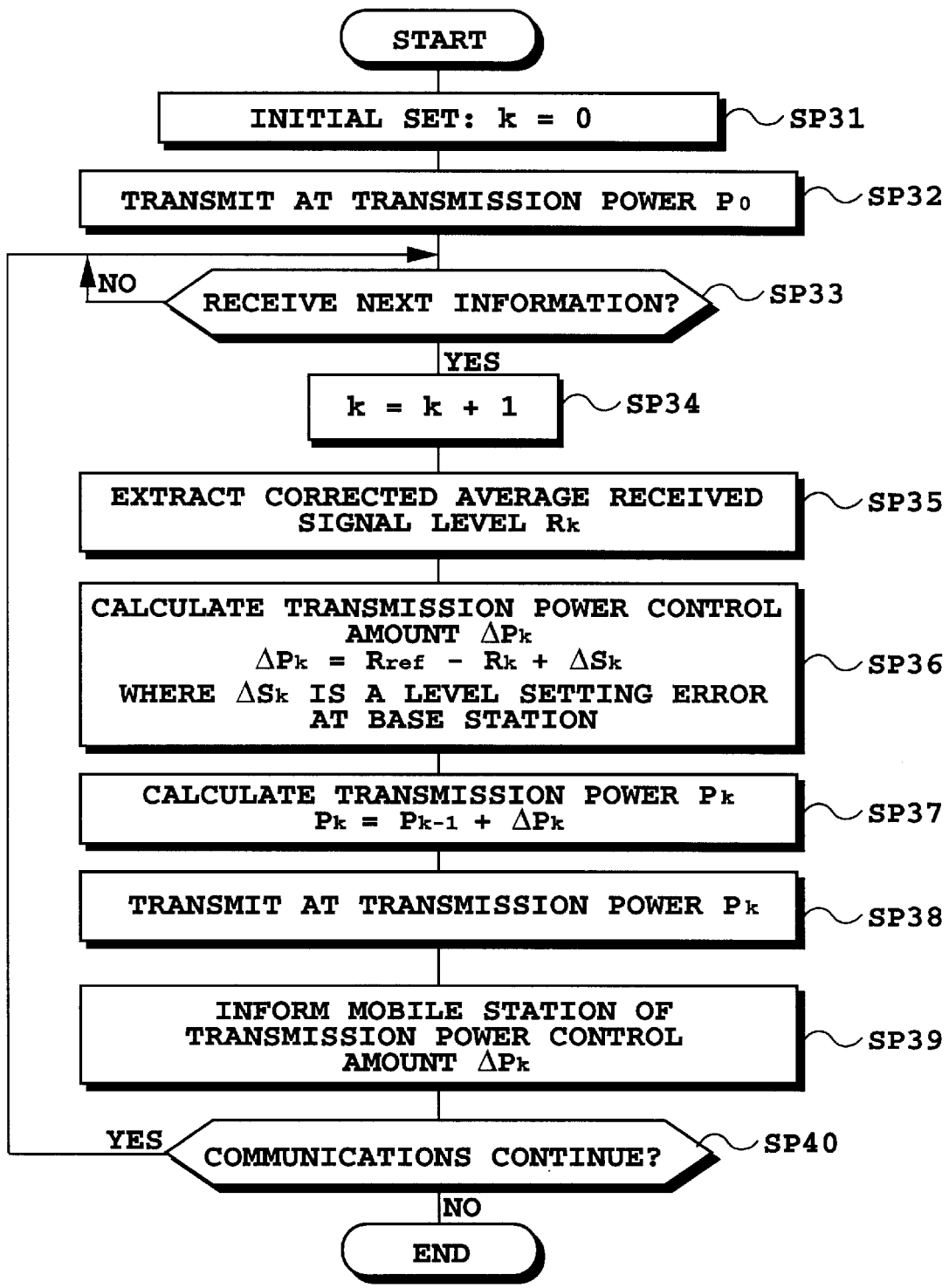
FIG. 15 is a flowchart showing the operation of the base station of the second embodiment.
Figure 16:
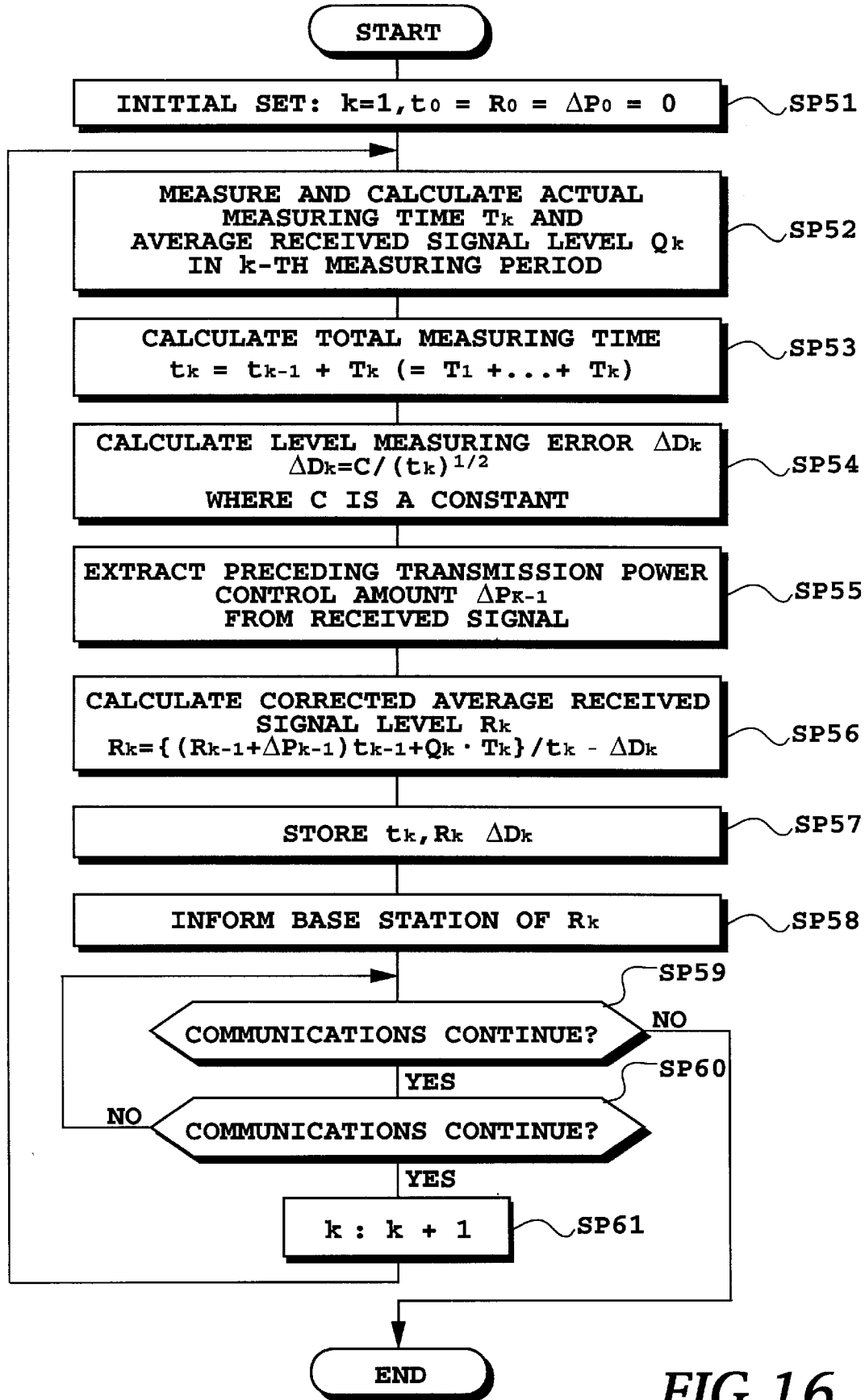
FIG. 16 is a flowchart showing the operation of the mobile station of the second embodiment.

FIGS. 15 and 16 are flowcharts showing in more detail the operation of the transmission power control in the second embodiment, wherein FIG. 15 illustrates the operation of the base station, and FIG. 16 illustrates the operation of the mobile station.

I. Control procedure of the base station

1. Initial procedure

After completing the initial set at step SP31 of FIG. 15, the base station starts transmission at predetermined initial transmission power $P_0$ at step SP32. The base station keeps the transmission power until the corrected average received signal level $R_1$ is received from the mobile station. As the initial transmission power $P_0$, the maximum transmission power of the base station, or the transmission power predetermined in accordance with the type of the mobile station can be employed.

2. K-th transmission power control procedure

The receiver 27 of the base station decides whether the next information is received or not from the mobile station at step SP33. Upon receiving the next information, the receiver 27 increments the measuring period number k by one at step SP34, and extracts at step SP35 the k-th corrected average received signal level $R_k$ sent from the mobile station. Subsequently, at step SP36, the calculator 31 computes the present transmission power control amount $\Delta P_k$ by equation (9). At step SP37, the controller 35 of the base station computes the present transmission power $P_k$ by equation (10), and controls the transmitting amplifier 45 such that its transmission power is adjusted to $P_k$ at step SP38.

At step SP39, the transmitter 43 of the base station transmits the transmission power control amount $\Delta P_k$ fed from the controller 35 to the mobile station. That amount is needed by the mobile station to calculate the next corrected average received signal level.

At step SP40, the receiver 27 detects whether or not the communications continue, and the calculator 31 terminates the processing if it detects the end of the communications. On the other hand, if the communications continue, the calculator 31 returns its control to step SP33, and awaits the next information from the mobile station. Upon receiving the next information, the receiver 27 increments k at step SP34, and repeats similar procedures.

II. Control procedure of the mobile station

The measuring block 61 of the mobile station starts measuring of the average received signal level simultaneously with the start of the communications. After carrying out the initial set at step SP51 of FIG. 16, the measuring block 61 measures the actual measuring time $T_k$ and average received signal level $Q_k$ in each predetermined measuring period T at step SP52. The measured average received signal level $Q_k$ are fed to the calculator 63 together with the actual measuring time $T_k$.

The total measuring time calculator 631 of the calculator 63 computes the total measuring time $t_k$ at step SP53 by adding the present actual measuring time $T_k$ to the preceding total measuring time $t_{k-1}$. At step SP54, the measuring error calculator 635 of the calculator 63 calculates the measuring error $\Delta D_k$ of the mobile station by equation (1). At step SP55, the receiver 57 extracts the preceding transmission power control amount $\Delta P_{k-1}$ from the received signal. In addition, the corrected average received signal level calculator 633 of the calculator 63 computes the corrected average received signal level $R_k$ at step SP56.

At step SP57, the total measuring time $t_k$, the corrected average received signal level $R_k$ and the measuring error $\Delta D_k$ are stored in the memory 65. These values are necessary for computing the next corrected average received signal level. At step SP58, the calculator 58 informs the base station of the corrected average received signal level $R_k$ through the transmitter 73.

The foregoing processing are continued until the end of the communications is detected at step SP59. Specifically, the procedures at step SP52 and the following steps are continued during the communications by incrementing the measuring period number k at step SP61 every time the passing of the measuring period T is detected at step SP60.

The present embodiment has an advantage that the calculation load of the base station is reduced because the calculation of the corrected average received signal levels is shared by respective mobile stations.

Although the present embodiment obtains the corrected average received signal level $R_k$ by equation (8), a calculation method is not limited to this. For example, noticing the first term of the right-hand side of equation (8) and equation (9), it is seen that the following equation holds.

$$R_{k-1}+P_{k-1}=R_{ref}+\Delta S_{k-1} \tag{11}$$

Substituting the right-hand side of this equation into equation (8) will result in the corrected average received signal level $R_k$. That is, the corrected average received signal level $R_k$ can be obtained by the following equation.

$$R_k\{(R_{ref}+\Delta S_{k-1})t_{k-1}+Q_k T_k\}/t_k \tag{12}$$

In this case, it is sufficient that the level setting error $\Delta S_k$ be stored instead of the left-hand side of equation (11).

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A mobile satellite communication system in which a base station is connected with a mobile station via a communication satellite, said mobile station comprising:
measuring means for obtaining an actual measuring time $T_k$ and an average received signal level $Q_k$ (k=1, 2, ... ) in a predetermined measuring period T; and
transmission means for informing said base station of said actual measuring time $T_k$ and said average received signal level $Q_k$, and said base station comprising:
means for extracting said actual measuring time $T_k$ and said average received signal level $Q_k$ from a received signal sent from said mobile station;
means for calculating a total measuring time $t_k$ which is a sum total of said actual measuring time $T_k$;
means for obtaining a measuring error $\Delta D_k$ of an average received signal level in said total measuring time $t_k$;
storing means for storing a total measuring time $t_{k-1}$, a corrected average received signal level $R_{k-1}$ and a transmission power control amount $\Delta P_{k-1}$ at the end of a preceding measuring period of said mobile station;

means for obtaining a corrected average received signal level $R_k$ at the end of a present measuring period of said mobile station on the basis of said corrected average received signal level $R_{k-1}$, said transmission power control amount $\Delta P_{k-1}$, said total measuring time $t_{k-1}$ said average received signal level $Q_k$, said actual measuring time $T_k$ and said total measuring time $t_k$;

means for calculating a transmission power control amount $\Delta P_k$ of said base station on the basis of said measuring error $\Delta D_k$ and a difference between said corrected average received signal level $R_k$ and a predetermined reference value $R_{ref}$ of the received signal level of said mobile station; and means for obtaining present transmission power $P_k$ from said transmission power control amount $\Delta P_k$ and preceding transmission power $P_{k-1}$, and for controlling the transmission power of said base station by said present transmission power $P_k$.

2. The mobile satellite communication system as claimed in claim 1, wherein said base station comprises means for setting an initial value $P_0$ of said transmission power at a predetermined value.

3. The mobile satellite communication system as claimed in claim 1, wherein said means for calculating a transmission power control amount obtains said present transmission power control amount $\Delta P_k$ of said base station by adding said measuring error $\Delta D_k$ to a difference between said reference value $R_{ref}$ of the received signal level and said corrected average received signal level $R_k$.

4. The mobile satellite communication system as claimed in claim 1, wherein said means for calculating a transmission power control amount obtains said present transmission power control amount $\Delta P_k$ of said base station by adding a sum of said measuring error $\Delta D_k$ and a level setting error $\Delta S_k$ at said base station to a difference between said reference value $R_{ref}$ of the received signal level and said corrected average received signal level $R_k$.

5. The mobile satellite communication system as claimed in claim 1, wherein said means for obtaining said measuring error obtains said measuring error $\Delta D_k$ by dividing a predetermined value C by a square root of said total measuring time $t_k$.

6. The mobile satellite communication system as claimed in claim 1, wherein said means for obtaining said corrected average received signal level obtains said corrected average received signal level $R_k$ by the following equation:

$$R_k = \{(R_{k-1} + \Delta P_{k-1})t_{k-1} + Q_k T_k\}/t_k.$$

7. A mobile satellite communication system in which a base station is connected with a mobile station via a communication satellite, said mobile station comprising:
measuring means for obtaining an actual measuring time $T_k$ and an average received signal level $Q_k$ (k=1, 2, . . . ) in a predetermined measuring period T;

means for calculating a total measuring time $t_k$ which is a sum total of said actual measuring time $T_k$;

means for obtaining a measuring error $\Delta D_k$ of an average received signal level in said total measuring time $t_k$;

storing means for storing a total measuring time $t_{k-1}$ and a corrected average received signal level $R_{k-1}$ at the end of a preceding measuring period of said mobile station;

means for extracting a transmission power control amount $\Delta P_{k-1}$ from a signal transmitted from said base station to said mobile station;

means for obtaining a corrected average received signal level $R_k$ at the end of a present measuring period of said mobile station on the basis of said corrected average received signal level $R_{k-1}$, said transmission power control amount $\Delta P_{k-1}$, said total measuring time $t_{k-1}$, said average received signal level $Q_k$, said actual measuring time $T_k$ and said total measuring time $t_k$; and transmission means for informing said base station of said corrected average received signal level $R_k$, and said base station comprising:

means for extracting said corrected average received signal level $R_k$ from a received signal sent from said mobile station;

means for calculating said transmission power control amount $\Delta P_k$ of said base station on the basis of a prestored level setting error $\Delta S_k$ and a difference between said corrected average received signal level $R_k$ and a predetermined reference value $R_{ref}$ of the received signal level of said mobile station;

means for obtaining present transmission power $P_k$ from said transmission power control amount $\Delta P_k$ and preceding transmission power $P_{k-1}$, and for controlling the transmission power of said base station by said present transmission power $P_k$; and means for transmitting information on said present transmission power control amount $\Delta P_k$ to said mobile station.

8. The mobile satellite communication system as claimed in claim 7, wherein said mobile station further comprises means for setting an initial value $P_0$ of said transmission power at a predetermined value.

9. The mobile satellite communication system as claimed in claim 7, wherein said means for calculating a transmission power control amount obtains said present transmission power control amount $\Delta P_k$ of said base station by adding said level setting error $\Delta S_k$ to a difference between said reference value $R_{ref}$ of the received signal level and said corrected average received signal level $R_k$.

10. The mobile satellite communication system as claimed in claim 7, wherein said means for obtaining said measuring error obtains said measuring error $\Delta D_k$ by dividing a predetermined value C by a square root of said total measuring time $t_k$.

11. The mobile satellite communication system as claimed in claim 7, wherein said means for obtaining corrected average received signal level obtains said corrected average received signal level $R_k$ by the following equation:

$$R_k = \{(R_{k-1} + \Delta P_{k-1})t_{k-1} + Q_k T_k\}/t_k - \Delta D_k.$$

12. A base station in a mobile satellite communication system in which the base station is connected with a mobile station via a communication satellite, said base station comprising:

means for extracting from a received signal an actual measuring time $T_k$ and an average received signal level $Q_k$ (k=1, 2, . . . ) in a predetermined measuring period T, said actual measuring time $T_k$ and said average received signal level $Q_k$ being obtained at said mobile station and transmitted from said mobile station to said base station;

means for calculating a total measuring time $t_k$ which is a sum total of said actual measuring time $T_k$;

means for obtaining a measuring error $\Delta D_k$ of an average received signal level in said total measuring time $t_k$;

storing means for storing a total measuring time $t_{k-1}$, a corrected average received signal level $R_{k-1}$ and a transmission power control amount $\Delta P_{k-1}$ at the end of a preceding measuring period of said mobile station;

means for obtaining a corrected average received signal level $R_k$ at the end of a present measuring period of said mobile station on the basis of said corrected average received signal level $R_{k-1}$, said transmission power control amount $\Delta P_{k-1}$, said total measuring time $t_{k-1}$, said average received signal level $Q_k$, said actual measuring time T and said total measuring time $t_k$;

means for calculating a transmission power control amount $\Delta P_k$ of said base station on the basis of said measuring error $\Delta D_k$ and a difference between said corrected average received signal level $R_k$ and a predetermined reference value $R_{ref}$ of the received signal level of said mobile station; and means for obtaining present transmission power $P_k$ from said transmission power control amount $\Delta P_k$ and preceding transmission power $P_{k-1}$, and for controlling the transmission power of said base station by said present transmission power $P_k$.

13. A mobile station in a mobile satellite communication system in which a base station is connected with a mobile station via a communication satellite, said mobile station comprising:

measuring means for obtaining an actual measuring time $T_k$ and an average received signal level $Q_k$ (k=1, 2, . . . ) in a predetermined measuring period T; and transmission means for informing said base station of said actual measuring time $T_k$ and said average received signal level $Q_k$.

14. A mobile station in a mobile satellite communication system in which a base station is connected with a mobile station via a communication satellite, said mobile station comprising:

measuring means for obtaining an actual measuring time $T_k$ and an average received signal level $Q_k$ (k=1, 2, . . . ) in a predetermined measuring period T;

means for calculating a total measuring time $t_k$ which is a sum total of said actual measuring time means for obtaining a measuring error $\Delta D_k$ of an average received signal level in said total measuring time $t_k$;

storing means for storing a total measuring time $t_{k-1}$ and a corrected average received signal level $R_{k-1}$ at the end of a preceding measuring period of said mobile station;

means for extracting a transmission power control amount $\Delta P_{k-1}$ from a signal transmitted from said base station to said mobile station;

means for obtaining a corrected average received signal level $R_k$ at the end of a present measuring period of said mobile station on the basis of said corrected average received signal level $R_{k-1}$, said transmission power control amount $\Delta P_{k-1}$, said total measuring time $t_{k-1}$, said average received signal level $Q_k$, said actual measuring time $T_k$ and said total measuring time $t_k$; and transmission means for informing said base station of said corrected average received signal level $R_k$.

15. A base station in a mobile station in a mobile satellite communication system in which a base station is connected with a mobile station via a communication satellite, said base station comprising:

means for extracting a corrected average received signal level $R_k$ from a received signal sent from said mobile station;

means for calculating a transmission power control amount $\Delta P_k$ of said base station on the basis of a prestored level setting error $\Delta S_k$ and a difference between said corrected average received signal level $R_k$ and a predetermined reference value $R_{ref}$ of the received signal level of said mobile station;

means for obtaining present transmission power $P_k$ from said transmission power control amount $\Delta P_k$ and preceding transmission power $P_{k-1}$, and for controlling the transmission power of said base station by said present transmission power $P_k$; and means for transmitting information on said present transmission power control amount $\Delta P_k$ to said mobile station.

16. A mobile satellite communication system in which a base station is connected with a mobile station via a communication satellite, said mobile station comprising:

measuring means for obtaining an actual measuring time $T_k$ and an average received signal level $Q_k$ (k=1, 2, . . . ) in a predetermined measuring period T; and transmission means for informing said base station of said actual measuring time $T_k$ and said average received signal level $Q_k$ and said base station comprising:

means for extracting said actual measuring time $T_k$ and said average received signal level $Q_k$ from a received signal sent from said mobile station;

means for calculating a total measuring time $t_k$ which is a sum total of said actual measuring time $T_k$;

means for obtaining a measuring error $\Delta D_k$ of an average received signal level in said total measuring time $t_k$;

means for obtaining a total error $\Delta E_k$ by adding said measuring error $\Delta D_k$ to a predetermined level setting error $\Delta S_k$;

storing means for storing a total measuring time $t_{k-1}$, a corrected average received signal level $R_{k-1}$ and a transmission power control amount $\Delta P_{k-1}$ at the end of a preceding measuring period of said mobile station;

means for obtaining a corrected average received signal level $R_k$ at the end of a present measuring period of said mobile station on the basis of a predetermined reference value $R_{ref}$ of the received signal level of said mobile station, said total error $\Delta E_k$, said total measuring time $t_{k-1}$, said average received signal level $Q_k$, said actual measuring time $T_k$ and said total measuring time $t_k$ by the following equation;

$$R_k=\{(R_{ref}+\Delta E_{k-1})t_{k-1}+Q_kT_k\}/t_k$$

means for calculating a transmission power control amount $\Delta P_k$ of said base station on the basis of said total error $\Delta E_k$ and a difference between said reference value $R_{ref}$ of the received signal level and said corrected average received signal level $R_k$; and means for obtaining present transmission power $P_k$ from said transmission power control amount $\Delta P_k$ and preceding transmission power $P_{k-1}$, and for controlling the transmission power of said base station by said present transmission power $P_k$.

17. A mobile satellite communication system in which a base station is connected with a mobile station via a communication satellite, said mobile station comprising:

measuring means for obtaining an actual measuring time $T_k$ and an average received signal level $Q_k$ (k=1, 2, . . . ) in a predetermined measuring period T;

means for calculating a total measuring time $t_k$ which is a sum total of said actual measuring time $T_k$;

means for obtaining a measuring error $\Delta D_k$ of an average received signal level in said total measuring time $t_k$;

storing means for storing a total measuring time $t_{k-1}$ and a corrected average received signal level $R_{k-1}$ at the end of a preceding measuring period of said mobile station;

means for extracting a transmission power control amount $\Delta P_{k-1}$ from a signal transmitted from said base station to said mobile station;

means for obtaining a corrected average received signal level $R_k$ at the end of a present measuring period of said mobile station on the basis of a reference value $R_{ref}$ of the received signal level of said mobile station, a predetermined level setting error $\Delta S_k$ of said base station, said total measuring time $t_{k-1}$, said average received signal level $Q_k$, said actual measuring time $T_k$ and said total measuring time $t_k$ by the following equation;

$$R_k = \{(R_{ref} + \Delta S_{k-1}) t_{k-1} + Q_k T_k\} / t_k$$

transmission means for informing said base station of said corrected average received signal level $R_k$, and said base station comprising:

means for extracting said corrected average received signal level $R_k$ from a received signal sent from said mobile station;

means for calculating said transmission power control amount $\Delta P_k$ of said base station on the basis of said level setting error $\Delta S_k$ and a difference between said corrected average received signal level $R_k$ and said predetermined reference value $R_{ref}$ of the received signal level of said mobile station;

means for obtaining present transmission power $P_k$ from said transmission power control amount $\Delta P_k$ and preceding transmission power $P_{k-1}$, and for controlling the transmission power of said base station by said present transmission power $P_k$; and means for transmitting information on said present transmission power control amount $\Delta P_k$ to said mobile station.

18. A transmission power control method in a mobile satellite communication system in which a base station is connected with a mobile station via a communication satellite, said method comprising the steps of:

obtaining an actual measuring time $T_k$ and an average received signal level $Q_k$ (k=1, 2, . . . ) in a predetermined measuring period T at said mobile station;

calculating a total measuring time $t_k$ which is a sum total of said actual measuring time $T_k$;

obtaining a measuring error $\Delta D_k$ of an average received signal level in said total measuring time $t_k$;

storing a total measuring time $t_{k-1}$, a corrected average received signal level $R_{k-1}$ and a transmission power control amount $\Delta P_{k-1}$ at the end of a preceding measuring period of said mobile station;

obtaining a corrected average received signal level $R_k$ at the end of a present measuring period of said mobile station on the basis of said corrected average received signal level $R_{k-1}$, said transmission power control amount $\Delta P_{k-1}$, said total measuring time $t_{k-1}$, said average received signal level $Q_k$, said actual measuring time $T_k$ and said total measuring time $t_k$;

calculating a transmission power control amount $\Delta P_k$ of said base station on the basis of said measuring error $\Delta D_k$ and a difference between said corrected average received signal level $R_k$ and a predetermined reference value $R_{ref}$ of the received signal level of said mobile station; and obtaining present transmission power $P_k$ from said transmission power control amount $\Delta P_k$ and preceding transmission power $P_{k-1}$, and for controlling the transmission power of said base station by said present transmission power $P_k$.

* * * * *